United States Patent
Palavalli et al.

(10) Patent No.: US 11,182,717 B2
(45) Date of Patent: Nov. 23, 2021

(54) METHODS AND SYSTEMS TO OPTIMIZE SERVER UTILIZATION FOR A VIRTUAL DATA CENTER

(71) Applicant: VMWARE, INC., Palo Alto, CA (US)

(72) Inventors: Amarnath Palavalli, Seattle, WA (US); Kumar Gaurav, Bangalore (IN)

(73) Assignee: VMWARE. INC., Palo Alto, CA (US)

( * ) Notice: Subject to any disclaimer, the term of this patent is extended or adjusted under 35 U.S.C. 154(b) by 0 days.

(21) Appl. No.: 16/837,866

(22) Filed: Apr. 1, 2020

(65) Prior Publication Data

US 2020/0226520 A1    Jul. 16, 2020

Related U.S. Application Data

(63) Continuation of application No. 15/603,492, filed on May 24, 2017, which is a continuation-in-part of application No. 14/604,679, filed on Jan. 24, 2015.

(30) Foreign Application Priority Data

Jun. 24, 2016 (IN) .............................. 201641021832
Apr. 12, 2017 (IN) .............................. 201743013132

(51) Int. Cl.
G06Q 10/06    (2012.01)
G06F 9/455    (2018.01)
G06F 9/50     (2006.01)

(52) U.S. Cl.
CPC ... *G06Q 10/06315* (2013.01); *G06F 9/45504* (2013.01); *G06F 9/5077* (2013.01); *G06Q 10/06* (2013.01)

(58) Field of Classification Search
None
See application file for complete search history.

(56) References Cited

U.S. PATENT DOCUMENTS 5,623,598 A    4/1997 Voigt
5,805,166 A    9/1998 Hall
(Continued)

FOREIGN PATENT DOCUMENTS

CA    2637980    8/2007
EP    2019358    1/2009
(Continued)

OTHER PUBLICATIONS

S. K. Shrivastava, P. Kumar and A. Pandey, "Impact of Software Licenses in Cloud Computing Based E-Governance Initiatives," 2014 Fourth International Conference on Communication Systems and Network Technologies, Bhopal, India, 2014, pp. 592-596, doi: 10.1109/CSNT.2014.125. (Year: 2014).*
(Continued)

*Primary Examiner* — Jerry O'Connor
*Assistant Examiner* — Shelby A Turner
(74) *Attorney, Agent, or Firm* — Clayton, McKay & Bailey, PC

(57) ABSTRACT

Methods and systems assist data center customer to plan virtual data center ("VDC") configurations, create purchase recommendations to achieve either an expansion or contraction of a VDC, and optimize the data center cost. Methods generate recommendations on lower cost combinations of virtual machine ("VM") guest OS licenses, server computer hardware and VM software to optimize the costs are generated, generate data center customer plans for additional VMs with guest OS for a projected period of time, provide recommendations on lower cost combination of guest OS licenses, server hardware, and VM software to optimize the cost. Methods also report any underutilized licensed servers and provide recommendations for cost savings when volume licenses can be replaced by instance based software licenses. Methods may generate VM placement recommendations to
(Continued)

data center customers while the customers attempt to manually migrate VMs to different server computers.

20 Claims, 18 Drawing Sheets

(56) References Cited

U.S. PATENT DOCUMENTS

| | | | |
|---|---|---|---|
| 6,496,948 B1 | 12/2002 | Smorodinsky |
| 6,606,658 B1 | 8/2003 | Uematsu |
| 6,810,367 B2 | 10/2004 | Barnard |
| 6,880,002 B2 | 4/2005 | Hirschfeld |
| 7,016,972 B2 | 3/2006 | Bertram |
| 7,051,098 B2 | 5/2006 | Masters |
| 7,092,985 B2 | 8/2006 | Hubbard |
| 7,117,499 B2 | 10/2006 | Kawamoto |
| 7,203,944 B1 | 4/2007 | Van Rietschote |
| 7,243,145 B1 | 7/2007 | Poortman |
| 7,283,935 B1 | 10/2007 | Pritchard |
| 7,313,512 B1 | 12/2007 | Traut |
| 7,392,360 B1 | 6/2008 | Aharoni |
| 7,401,012 B1 | 7/2008 | Bonebakker |
| 7,437,459 B2 | 10/2008 | Chidambaran |
| 7,480,773 B1 | 1/2009 | Reed |
| 7,484,208 B1 | 1/2009 | Nelson |
| 7,503,031 B2 | 3/2009 | Chang |
| 7,552,438 B1 | 6/2009 | Werme |
| 7,561,514 B2 | 7/2009 | Elmasry |
| 7,617,375 B2 | 11/2009 | Flemming |
| 7,730,486 B2 | 6/2010 | Herington |
| 7,738,129 B2 | 6/2010 | Bansal |
| 7,793,288 B2 | 9/2010 | Sameske |
| 7,831,820 B2 | 11/2010 | Winner |
| 7,836,348 B2 | 11/2010 | Buccella |
| 7,890,951 B2 | 2/2011 | Vinberg et al. |
| 7,933,987 B2 | 4/2011 | Aidun |
| 7,966,614 B2 | 6/2011 | Chodroff |
| 7,984,108 B2 | 7/2011 | Landis |
| 7,996,696 B1 | 8/2011 | Haney |
| 8,013,859 B2 | 9/2011 | Cannon |
| 8,032,780 B2 | 10/2011 | Koh |
| 8,065,676 B1 | 11/2011 | Sahai |
| 8,099,487 B1 | 1/2012 | Smirnov |
| 8,112,527 B2 | 2/2012 | Kawato |
| 8,112,756 B2 | 2/2012 | Cherkasova |
| 8,161,475 B2 | 4/2012 | Araujo |
| 8,185,893 B2 | 5/2012 | Hyser |
| 8,209,687 B2 | 6/2012 | Yuyitung |
| 8,214,838 B2 | 7/2012 | Cherkasova |
| 8,229,999 B2 | 7/2012 | Devarakonda |
| 8,234,640 B1 | 7/2012 | Fitzgerald, II |
| 8,234,641 B2 | 7/2012 | Fitzgerald |
| 8,245,140 B2 | 8/2012 | Barber |
| 8,261,277 B2 | 9/2012 | Prabhakar |
| 8,296,760 B2 | 10/2012 | Magenheimer |
| 8,336,054 B2 | 12/2012 | Cherkasova |
| 8,347,297 B2 | 1/2013 | Mateo |
| 8,355,407 B2 | 1/2013 | Wookey |
| 8,386,495 B1 | 2/2013 | Sandler |
| 8,448,006 B2 | 5/2013 | Floyd |
| 8,584,131 B2 | 11/2013 | Wong |
| 8,601,471 B2 | 12/2013 | Beaty |
| 8,606,886 B2 | 12/2013 | Kerr |
| 8,612,971 B1 | 12/2013 | Fitzgerald |
| 8,650,296 B1 | 2/2014 | Herington |
| 8,661,438 B2 | 2/2014 | Ding |
| 8,667,500 B1 | 3/2014 | Ji |
| 8,676,956 B1 | 3/2014 | Johnson |
| 8,707,194 B1 | 4/2014 | Jenkins |
| 8,707,383 B2 | 4/2014 | Bade |
| 8,732,699 B1 | 5/2014 | Hyser |
| 8,738,333 B1 | 5/2014 | Behera |
| 8,738,972 B1 | 5/2014 | Bakman |
| 8,775,593 B2 | 7/2014 | O'Sullivan |
| 8,776,050 B2 | 7/2014 | Plouffe |
| 8,805,647 B2 | 8/2014 | Smirnov |
| 8,806,480 B2 | 8/2014 | Araujo |
| 8,875,266 B2 | 10/2014 | Chambers |
| 8,880,682 B2 | 11/2014 | Bishop |
| 8,903,888 B1 | 12/2014 | Hyser |
| 8,903,983 B2 | 12/2014 | Bakman |
| 8,918,783 B2 | 12/2014 | Mattiocco |
| 8,935,493 B1 | 1/2015 | Dolan |
| 8,949,364 B2 | 2/2015 | Miloushev |
| 8,949,825 B1 | 2/2015 | Fitzgerald |
| 8,949,826 B2 | 2/2015 | Fitzgerald |
| 9,218,047 B2 | 5/2015 | Oney |
| 9,086,917 B1 | 7/2015 | Fitzgerald |
| 9,092,250 B1 | 7/2015 | Hyser |
| 9,098,333 B1 | 8/2015 | Obrecht |
| 9,124,488 B2 | 9/2015 | Wong |
| 9,210,141 B2 | 12/2015 | Anderson |
| 9,225,610 B2 | 12/2015 | Murase |
| 9,275,172 B2 | 3/2016 | Ostermeyer |
| 9,495,270 B2 | 11/2016 | Wong |
| 9,547,485 B2 | 1/2017 | Suzuki |
| 9,606,821 B2 | 3/2017 | Robinson |
| 9,654,367 B2 | 5/2017 | Hillier |
| 9,697,019 B1 | 7/2017 | Fitzgerald |
| 9,727,440 B2 | 8/2017 | Suit |
| 9,858,123 B1 | 1/2018 | Daillanas |
| 10,069,680 B1* | 9/2018 | Wylie .................... H04L 67/02 |
| 10,936,976 B2* | 3/2021 | Ginis .................... G06Q 10/06 |
| 2003/0006988 A1 | 1/2003 | Alford |
| 2003/0233391 A1 | 12/2003 | Crawford |
| 2004/0061701 A1 | 4/2004 | Arquie |
| 2004/0221176 A1 | 11/2004 | Cole |
| 2005/0060590 A1 | 3/2005 | Bradley |
| 2006/0069761 A1 | 3/2006 | Singh |
| 2006/0107087 A1 | 5/2006 | Sieroka |
| 2006/0184936 A1 | 8/2006 | Abels |
| 2006/0195715 A1 | 8/2006 | Herington |
| 2006/0277206 A1 | 12/2006 | Bailey |
| 2007/0204266 A1 | 8/2007 | Beaty, II |
| 2007/0245348 A1 | 10/2007 | Araujo, Jr. |
| 2007/0260723 A1 | 11/2007 | Cohen |
| 2007/0262994 A1 | 11/2007 | Meighan |
| 2007/0271560 A1 | 11/2007 | Wahlert |
| 2008/0059556 A1 | 3/2008 | Greenspan |
| 2008/0133324 A1* | 6/2008 | Jackson ................ G06F 21/105 |
| | | 705/348 |
| 2008/0134176 A1 | 6/2008 | Fitzgerald |
| 2008/0196043 A1 | 8/2008 | Feinleib |
| 2008/0025653 A1 | 10/2008 | Ben-Yehuda |
| 2008/0243699 A1* | 10/2008 | Hilerio .................. G06F 21/105 |
| | | 705/59 |
| 2008/0271019 A1 | 10/2008 | Stratton |
| 2008/0306786 A1* | 12/2008 | Lonowski .............. G06Q 30/06 |
| | | 705/7.11 |
| 2009/0019316 A1 | 1/2009 | Buccella |
| 2009/0172666 A1 | 7/2009 | Yahalom |
| 2009/0228984 A1* | 9/2009 | Sterin ................ G06Q 10/0637 |
| | | 726/26 |
| 2009/0237404 A1 | 9/2009 | Cannon |
| 2009/0300173 A1 | 12/2009 | Bakman |
| 2009/0328056 A1 | 12/2009 | McCune |
| 2010/0080129 A1 | 4/2010 | Strahan |
| 2010/0125665 A1 | 5/2010 | Simpson |
| 2010/0205303 A1 | 8/2010 | Chaturvedi |
| 2010/0262974 A1 | 10/2010 | Uyeda |
| 2010/0306382 A1 | 12/2010 | Cardosa |
| 2011/0055399 A1 | 3/2011 | Tung |
| 2011/0072253 A1* | 3/2011 | Iqbal ...................... G06Q 10/04 |
| | | 713/1 |
| 2011/0113136 A1 | 5/2011 | Phaal |
| 2011/0119191 A1 | 5/2011 | Stern |
| 2011/0145657 A1 | 6/2011 | Bishop |
| 2011/0161858 A1 | 6/2011 | Barber |
| 2011/0219118 A1 | 9/2011 | Cowan |
| 2011/0261055 A1 | 10/2011 | Wong |
| 2011/0296429 A1* | 12/2011 | Segmuller ............. G06F 21/105 |
| | | 718/104 |
| 2012/0053925 A1 | 3/2012 | Geffen |

(56) References Cited

U.S. PATENT DOCUMENTS

| | | | |
|---|---|---|---|
| 2012/0059917 A1* | 3/2012 | Dawson | G06F 21/105 709/223 |
| 2012/0131578 A1* | 5/2012 | Ciano | G06F 9/45558 718/1 |
| 2012/0203590 A1 | 8/2012 | Deb | |
| 2012/0272234 A1 | 10/2012 | Kaiser | |
| 2012/0297236 A1 | 11/2012 | Ziskind | |
| 2012/0297307 A1 | 11/2012 | Rider | |
| 2012/0324444 A1 | 12/2012 | Gulati | |
| 2012/0331114 A1* | 12/2012 | Garg | G06Q 10/00 709/220 |
| 2013/0007760 A1 | 1/2013 | O'Sullivan | |
| 2013/0042003 A1* | 2/2013 | Franco | G06F 9/45558 709/226 |
| 2013/0055262 A1 | 2/2013 | Lubsey | |
| 2013/0198370 A1 | 8/2013 | Aguchi | |
| 2013/0262250 A1 | 10/2013 | Lingafelt | |
| 2013/0297964 A1 | 11/2013 | Hegdal | |
| 2014/0007093 A1* | 1/2014 | Deshpande | G06F 9/45533 718/1 |
| 2014/0164594 A1 | 6/2014 | Crowell | |
| 2014/0196038 A1 | 7/2014 | Kottomtharayil | |
| 2014/0200953 A1 | 7/2014 | Mun | |
| 2014/0278820 A1 | 9/2014 | Dantuma | |
| 2014/0310817 A1* | 10/2014 | Chen | G06F 21/105 726/26 |
| 2014/0344440 A1 | 11/2014 | Dutta | |
| 2015/0067143 A1 | 3/2015 | Babakhan | |
| 2015/0286492 A1 | 10/2015 | Breitgand | |
| 2015/0339146 A1* | 11/2015 | Ponsford | G06F 9/5005 718/1 |
| 2016/0077860 A1 | 3/2016 | Machida | |
| 2016/0147550 A1* | 5/2016 | McWilliams | G06F 11/301 718/1 |
| 2017/0097845 A1* | 4/2017 | Kouznetsov | G06F 9/45558 |
| 2017/0353364 A1 | 12/2017 | Kreiner | |

FOREIGN PATENT DOCUMENTS

| | | |
|---|---|---|
| JP | 2008209994 | 9/2008 |
| WO | WO2003032125 A2 | 4/2003 |
| WO | WO2006077215 A1 | 7/2006 |

OTHER PUBLICATIONS

Credle et al. "Simplify Software Audits and Cut Costs by Using the IBM License Metric Tool", IBM Redbooks, An IBM Redpaper publication, Published Sep. 17, 2014, http://www.redbooks.ibm.com/abstracts/redp5107.html?Open (Year: 2014).*

Manoel et al. "Implementation Best Practices for IBM Tivoli License Manager", IBM Redbooks, An IBM Redbooks publication, Published May 16, 2006, http://www.redbooks.ibm.com/abstracts/SG247222.html (Year: 2006).*

G. C. Deka, "Cost-Benefit Analysis of Datacenter Consolidation Using Virtualization," in IT Professional, vol. 16, No. 6, pp. 54-62, Nov.-Dec. 2014, doi: 10.1109/MITP.2014.89 (Year: 2014).*

Deng, Wei, Fangming Liu, Hai Jin, Xiaofei Liao, and Haikun Liu. "Reliability-Aware Server Consolidation for Balancing Energy-Lifetime Tradeoff in Virtualized Cloud Datacenters." International Journal of Communication Systems 27, No. 4 (Apr. 2014): 623-42. doi:10.1002/dac.2687. (Year: 2014).*

X. Li, Y. Li, T. Liu, J. Qiu and F. Wang, "The Method and Tool of Cost Analysis for Cloud Computing," 2009 IEEE International Conference on Cloud Computing, 2009, pp. 93-100, doi: 10.1109/CLOUD.2009.84. (Year: 2009).*

The Roadmap to Virtual Infrastructure: Practical Implementation Strategies, VMware, Inc., 2006.

Tips and Tricks for Implementing Infrastructure Services on ESX Server, VMware, Inc., 2006.

Virtualization Overview, VMware, Inc., 2006.

VMware Infrastructure Architecture Overview, 2006.

Understanding Full Virtualization, Paravirtualization, and Hardware Assist, VMware, Inc., 2007.

VMware® vCenter™ Operations Standard Evaluator's Guide, 2011.

Resource Management Guide: ESX Server 3.0.1 and VirtualCenter 2.0.1, VMware, Inc., Aug. 24, 2006.

Introduction to VMware Infrastructure, VMware, Inc., Aug. 5, 2008.

OpManager—The best value in network management, Feb. 26, 2011.

Platespin Powerconvert PoweRecon, Jan. 28, 2007.

"Akorri BalancePoint 3.5 Configuration Guide", BalancePoint, Akorri, Sep. 22, 2010.

"Akorri BalancePoint Pocket Expert Guide Series: Analytics Cheat Sheet", Dec. 22, 2010.

"An Introduction to Data Center Infrastructure Management", Raritan, Inc., 2010.

"BalancePoint: Overview".

"Guest Operating System Installation Guide", VMware, Inc. (https://web.archive.org/web/20060823171603/http://www.vmware.com/pdf/GuestOS_guide.pdf), Aug. 23, 2006.

"HP OpenView Operations Smart Plug-In for WebLogic Server: User's Guide", Hewlett-Packard, 2001.

"I/O Compatibility Guide for ESX Server 3.0", VMware, Inc., (https://web.archive.org/web/20060901090802/http://www.vmware.com/pdf/vi3_io_guide.pdf), Aug. 30, 2006.

"Interpreting CPU Utilization for Performance Analysis", Microsoft Server Performance, Aug. 6, 2009.

"PRTG Network Monitor 7.3—User Manual", Paessler, 2010.

"Quick Start Guide", VMware, Inc. (https://web.archive.org/web/20060828082007/http://www.vmware.com:80/pdf/vi3_esx_quickstart.pdf), Aug. 28, 2006.

"Resource Management with VMware DRS", VMWare Infrastructure, VMware Best Practices, pp. 1-24, 1998-2006.

"Resource utilization and performance", IBM.

"Storage / SAN Compatibility Guide for ESX Server 3.0", VMware, Inc. (https://web.archive.org/web/20060901090844/http://www.vmware.com/pdf/vi3_san_guide.pdf, Aug. 30, 2006.

"Systems Compatibility Guide for ESX Server 3.0", VMware, Inc., ESX Compatibility, (https://web.archive.org/web/20060901092211/http://www.vmware.com/pdf/vi3_systems_guide.pdf), Aug. 30, 2006.

"Virtual Infrastructure Management Datasheet", Akorri BalancePoint, 2009.

"Virtual System Profile", DMTF, Document No. DSP 1057, Version 1.0.0. Apr. 22, 2010, https://www.dmtf.org/sites/default/files/standards/documents/DSP1057_1.0.0._0_.pdf (Year 2010).

"Virtualization: State of the Art", SCOPE Alliance, Version 1.0., Apr. 2008 http://www.profsandhu.com/cs6393_s14/SCOPE-Virtualization-StateofTheArt-Version-1.0.pdf (Year: 2008).

"Virtualization: Current Benefits and Future Potential", Technology Concepts and Business Considerations, EMC Corporation, Jan. 2008.

"VMware Converter User's Manual", VMware, Inc.(https://web.archive.org/web/20070202043435/https://www.vmware.com/pdf/VMware_Converter_manual.pdf), Dec. 2006.

"VMware vCenter Operations Standard Evaluator's Guide", Installing, Deploying and Using VMware vCenter Operations Standard, Apr. 2011.

Ahmad, Irfan , "Proceedings of the Sixth Annual Workshop on Workload Characterization", IEEE Computer Socieity, Oct. 27, 2003.

Barham, Paul , et al., "Xen and the Art of Virtualization", University of Cambridge Computer Laboratory, Oct. 19, 2003.

Bari , "Data Center Network Virtualization: A Survey", IEEE Communications Surveys & Tutorials, vol. 15 No. 2, Second Quarter 2013 https://ieeexplore.ieee.org/document/6308765/ (Year 2013).

Bastoni, Andrea , et al., "Discovering hypervisor overheads using micro and macrobenchmarks", System Programming Research Group, University of Rome "Tor Vorgata" Roma, Italy.

Beloglazov, Anton , et al., "Energy Efficient Resource Management in Virtualized Cloud Data Centers", 2010.

(56) References Cited

OTHER PUBLICATIONS

Beloglazov, Anton, et al., "Energy-Aware Resource Allocation Heuristics for Efficient Management of Data Centers for Cloud Computing", May 23, 2011.
Berral, Josep LL, et al., "Towards energy-aware scheduling in data centers using machine learning".
Bradley, Duane, "Citrix Presentation Server Load Management—Part 3: Load Evaluators", Jan. 3, 2007.
Buyya, Rajkumar, et al., "Energy-Efficient Management of Data Center Resources for Cloud Computing: A Vision, Architectural Elements, and Open Challenges", Jun. 2010.
Buyya, Rajkumar, "PARMON: a portable and scalable monitoring system for clusters", 2000.
Chase, Jeffrey S., "Managing Energy and Server Resources in Hosting Centers".
Cherkasova, Ludmila, et al., "Comparison of the Three CPU Schedulers in Xen", ACM SIGMETRICS Performance Evaluation Review, Sep. 2007.
Cherkasova, Ludmila, et al., "When Virtual is Harder than Real: Resource Allocation Challenges in Virtual Machine Based IT Environments", Enterprise Systems and Software Laboratory, HP Laboratories Palo Alto, Feb. 8, 2007.
Curino, Carlo, et al., "Workload-Aware Database Monitoring and Consolidation", Apr. 5, 2019.
Gilman, Andrew, et al., Akorri BalancePoint: End-to-End Visibility Across Virtualized Servers and Dell Equallogic iSCSI SANs, Mar. 2009.
Gupta, Diwaker, et al., "Enforcing Performance Isolation Across Virtual Machines in Xen", University of California.
Gupta, Diwaker, et al., "Enforcing Performance Isolation Across Virtual Machines in Xen", University of California, San Diego.
Gupta, Diwaker, et al., "XenMon: QoS Monitoring and Performance Profiling Tool", Oct. 18, 2005.
Hauge, Bonnie S., et al., "Reliability Centered Maintenance and Risk Assessment", 2001.
Hillier, Andrew, "Dynamic Capacity Management in Virtual Environments", 2008.
Huang, Wei, et al., "A Case for High Performance Computing with Virtual Machine", Computer Science and Engineering, The Ohio State University, Jun. 28, 2006.
Keahey, K., et al., "Virtual Playgrounds: Managing Virtual Resources in the Grid", 2006.
Khanna, Gunjan, et al., Application Performance Management in Virtualized Server Environments, 2006.
Koh, Younggyun, et al., An Analysis of Performance Interference Effects in Virtual Environments.
Korelc, Justin, et al., "Analyzing performance in virtualized environments".
Li, Jianxin, "An Efficient Resource Management System for On-Line Virtual Cluster Provision", Jan. 2009.
Liao, Qi, et al., "Visualizing Graph Dynamics and Similarity for Enterprise Network Security and Management", Sep. 14, 2010.
Lindholm, Tim, et al., The Java® Virtual Machine Specification, Feb. 13, 2015.
Liu, Liang, "GreenCloud: A New Architecture for Green Data Center", Jun. 16, 2009.
Mann, Andi, "Virtualization 101: Technologies, Benefits, and Challenges", A white paper by Andi Mann, EMA Senior Analyst, Aug. 2006.
Marshall, Paul, "Improving Utilization of Infrastructure Clouds".
McHeick, Hamid, et al., "Evaluation of Load Balance Algorithms", Aug. 2011.
McLean, Ian, et al., "Monitoring and Performance in Windows 7", Oct. 21, 2009.
Menon, Aravind, et al., Diagnosing Performance Overheads in the Xen Virtual Machine Environment, Jun. 11, 2005.
Menon, Aravind, "Optimizing Network Virtualization in Xen", Apr. 17, 2006.
Moller, Kim-Thomas, "Virtual Machine Benchmarking", Apr. 17, 2007.
Nathuji, Ripal, et al., "VPM tokens: virtual machine-aware power budgeting in datacenters", Jan. 23, 2009.
Neogi, Anindya, "A Smarter Planning Tool for Virtual Environments", IBM Cloud/Virtualization Management Blog, Jun. 11, 2011.
Padala, Pradeep, et al., "Performance Evaluation of Virtualization Technologies for Server Consolidation", Hewlett-Packard Development Company, L.P., Sep. 30, 2008.
Raman, Rajesh, et al., "Policy Driven Heterogeneous Resource Co-Allocation with Gangmatching", Proceedings of the 12th IEEE International Symposium on High Performance Distributed Computing, 2003.
Rousselle, Philip, et al., "The Virtual Computing Environment", Northeast Parallel Architectures Center, Department of Electrical and Computer Engineering, Syracuse University, Sep. 1994.
Schnorr, Lucas Mello, et al., "Triva: Interactive 3d visualization for performance analysis of parallel applications".
Siegel, Leah J., et al., "Performance Measures for Evaluating Algorithms for SIMD Machines", IEEE Transactions on Software Engineering, vol. SE-*, No. 4, Jul. 4, 1982.
Singh, Aameek, et al., "SPARK: Integrated Resource Allocation in Virtualization-Enabled SAN Data Centers", IBM Research Report, Apr. 18, 2007.
Sloof, Eric, "vCenter Operations—Your Future Performance Dashboard", Mar. 8, 2011.
Smith, James, "The Architecture of Virtual Machines", IEEE Computer Society, May 2005 https://ieeexplore.ieee.org/document/1430629/ (Year 2005).
Stoess, Jan, et al., "Energy Management for Hypervisor-Based Virtual Machines", 2007.
Sugerman, Jeremy, et al., "Virtualizing I/O Devices on VMware Workstation's Hosted Virtual Machine Monitor", Proceedings of the 2001 USENIX Annual Technical Conference, Jun. 25, 2001.
Uhlig, Rich, et al., "Intel Virtualization Technology", Computer, May 2005.
Verma, Akshat, et al., "pMapper: Power and Migration Cost Aware Application Placement in Virtualized Systems", 2008.
Warneke, Daniel, et al., "Exploiting Dynamic Resource Allocation for Efficient Parallel Data Processing in the Cloud", Jan. 2011.
Wolf, Chris, "Let's Get Virtual: A Look at Today's Server Virtualization Architectures", Burton Group, May 14, 2007.
Wolf, Chris, "Let's Get Virtual: A Look at Today's Server Visualization Architectures", Burton Group, (http://hosteddocs.ittoolbox.com/let'sgetvirt.pdf), May 14, 2007.
Wood, Timothy, et al., Black-Box and Gray-Box Strategies for Virtual Machine Migration, Mar. 9, 2007.
Wood, Timothy, et al., "Black-box and Gray-box Strategies for Virtual Machine Migration", Apr. 2007.
Xu, Yunlong, et al., "Research and Design of a Remote Visualization Parallel Program Performance Analysis Tool", 2010.
Yarbrough, Stan, "Akorri BalancePoint: Overview", May 6, 2010.
Zhikui, Wang, et al., Capacity and Performance Overhead in Dynamic Resource Allocation to Virtual Containers, May 2007.
"International Journal of Communication Systems 27, No. 4", Deng Wei, Fangming Liu, Hai Jin, Xiaofei Liao, and Haikun Liu. "Reliability-Aware Server Consolidation for Balancing Energy-Lifetime Tradeoff in Virtualized Cloud Datacenters." (Apr. 2014): 623-42. doi:10. 1002/dac.2687. Year 2014.
Whalley, Ian, et al., "License-aware management of virtual machines. ", 12th IFIP/IEEE International Symposium on Integrated Network Management (IM 2011) and Workshops. IEEE (Year: 2011).

\* cited by examiner

METHODS AND SYSTEMS TO OPTIMIZE SERVER UTILIZATION FOR A VIRTUAL DATA CENTER

CROSS-REFERENCES TO RELATED APPLICATIONS

This application is a Continuation of U.S. patent application Ser. No. 15/603,492 entitled "METHODS AND SYSTEMS TO OPTIMIZE OPERATING SYSTEM LICENSE COSTS IN A VIRTUAL DATA CENTER", filed May 24, 2017, which is a Continuation-in-part of patent application Ser. No. 14/604,679 entitled "MINIMIZING GUEST OPERATING SYSTEM LICENSING COSTS IN A VOLUME BASED LICENSING MODEL IN A VIRTUAL DATACENTER", filed on Jan. 24, 2015, which claims the benefit under 35 U.S.C. 119(a)-(d) to Indian Provisional Application number 201641021832 entitled "METHODS AND SYSTEMS TO OPTIMIZE OPERATING SYSTEM LICENSE COSTS IN A VIRTUAL DATA CENTER" filed on Jun. 24, 2016, and Indian Application number 201743013132 entitled "METHODS AND SYSTEMS TO OPTIMIZE OPERATING SYSTEM LICENSE COSTS IN A VIRTUAL DATA CENTER" filed on Apr. 12, 2017, by VMware, Inc., all of which are herein incorporated by reference in their entireties for all purposes.

TECHNICAL FIELD

The present disclosure is directed to optimizing cost of operating system licenses in a virtual data center.

BACKGROUND

Cloud-computing facilities provide computational bandwidth and data-storage services in much the same utility companies provide electrical power and water to consumers. Cloud computing provides enormous advantages to customers without the devices to purchase, manage, and maintain in-house data centers. In particular, cloud-computing customers can avoid the overhead of maintaining and managing physical computer systems, including hiring and periodically retraining information-technology ("IT") specialists and paying for operating system licenses and database-management-system upgrades. Customers typically run their applications in virtual machines ("VMs") that may be organized into virtual data centers ("VDCs"). The VMs may be provisioned with customer defined parameters for computing power, storage, and guest operating systems ("guest OSs"). Cloud-computing interfaces allow for easy and straightforward configuration of virtual computing facilities, such as VDCs, flexibility in the types of applications and operating systems that can be configured, and other functionalities that are useful even for owners and administrators of the cloud-computing facilities used by a customer. Computational and storage cost of a VDC is typically optimized by selecting a particular cluster of host server computers or a storage tier to run the VMs. However, costs do not include guest OS licensing costs in determining the overall costs of cloud-computer customers' VDCs.

SUMMARY

Methods and systems assist cloud-computing customer to plan virtual data center ("VDC") configurations, create purchase recommendations to achieve either an expansion or contraction of a VDC, and optimize VDC cost. Recommendations that lower the cost of combinations of virtual machine ("VM") guest OS licenses, server computer hardware and VM software are generated. Methods also generate customer plans for adding additional VMs for a projected period of time, provide recommendations on lower cost combinations of guest OS licenses, server hardware, and VM software in order to optimize VDC costs. Methods may report any underutilized licensed server computers and provide recommendations for cost savings when volume licenses can be replaced by instance-based software licenses. Methods may generate VM placement recommendations to cloud-computing customers while the customers attempt to manually migrate one or more VMs to different server computers.

DETAILED DESCRIPTION

Figure 1:
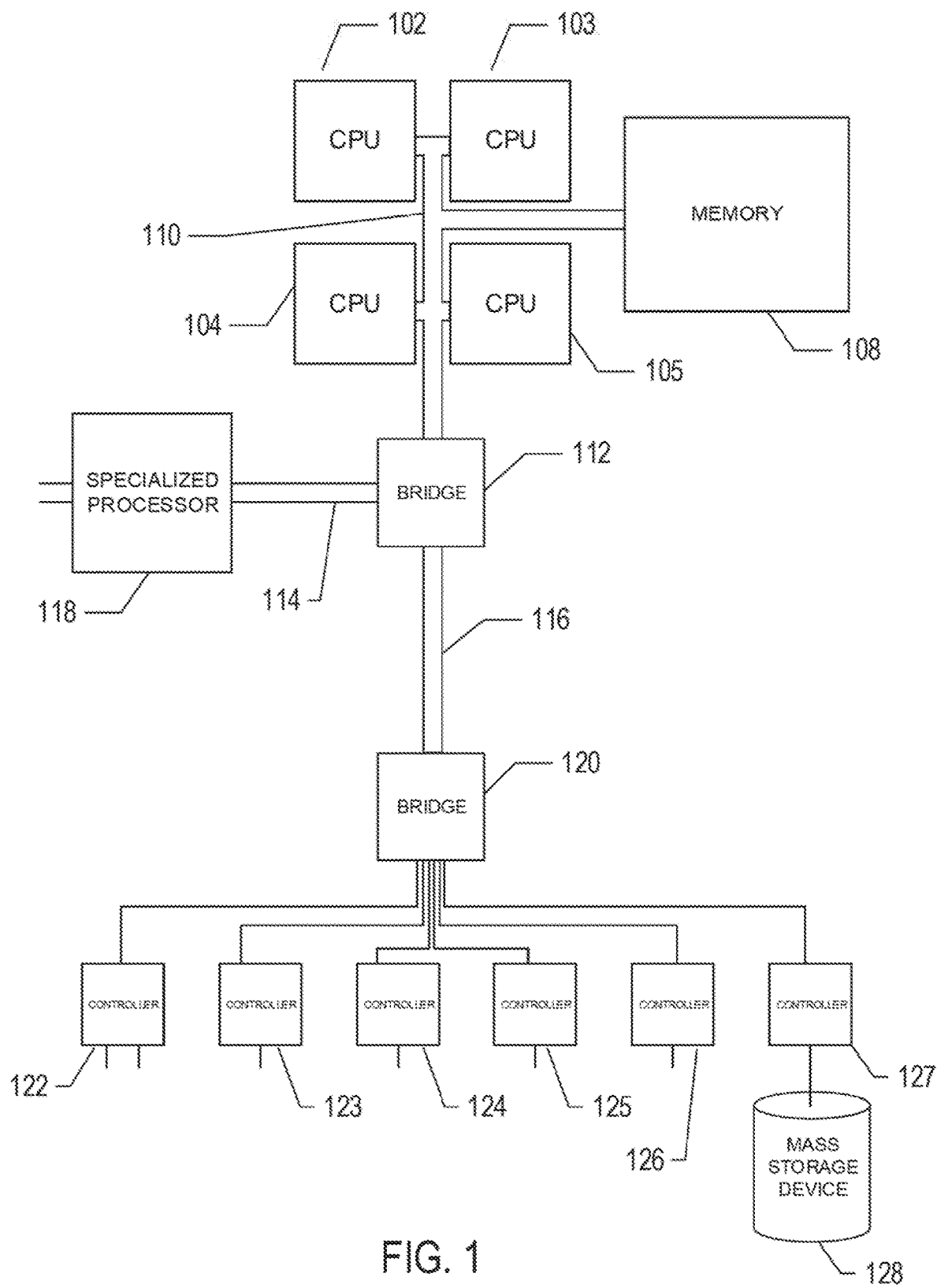
FIG. 1 shows a general architectural diagram for various types of computers.

This disclosure presents computational methods and systems that optimize operating system costs in a virtual data center. In a first subsection, computer hardware, complex computational systems, and virtualization are described. Methods and systems to optimize operating system costs in a virtual data center are described in a second subsection.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are intercom with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
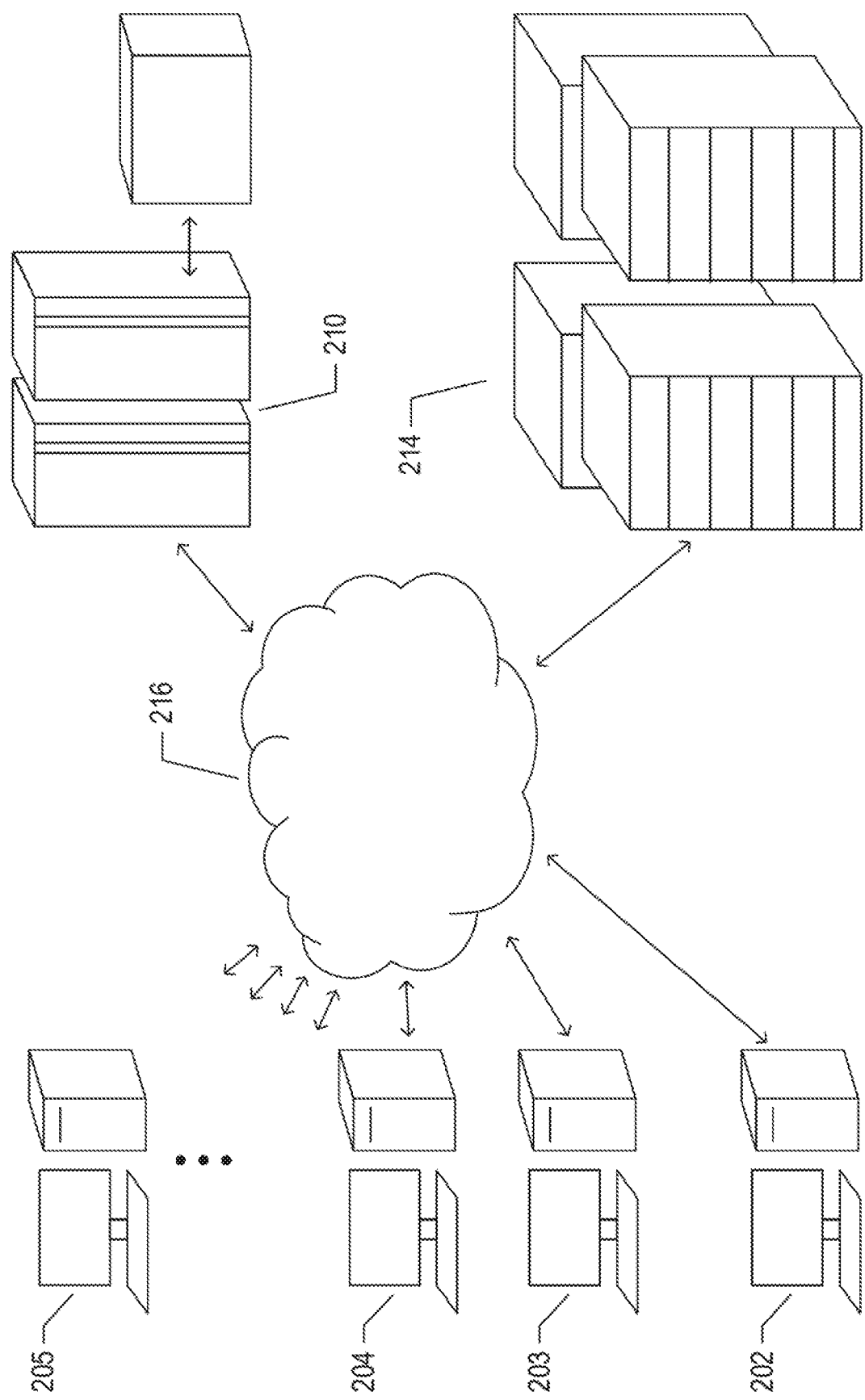
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user may access hundreds of millions of different websites provided by hundreds of thousands of different web servers throughout the world and may access high-computational-bandwidth coy computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
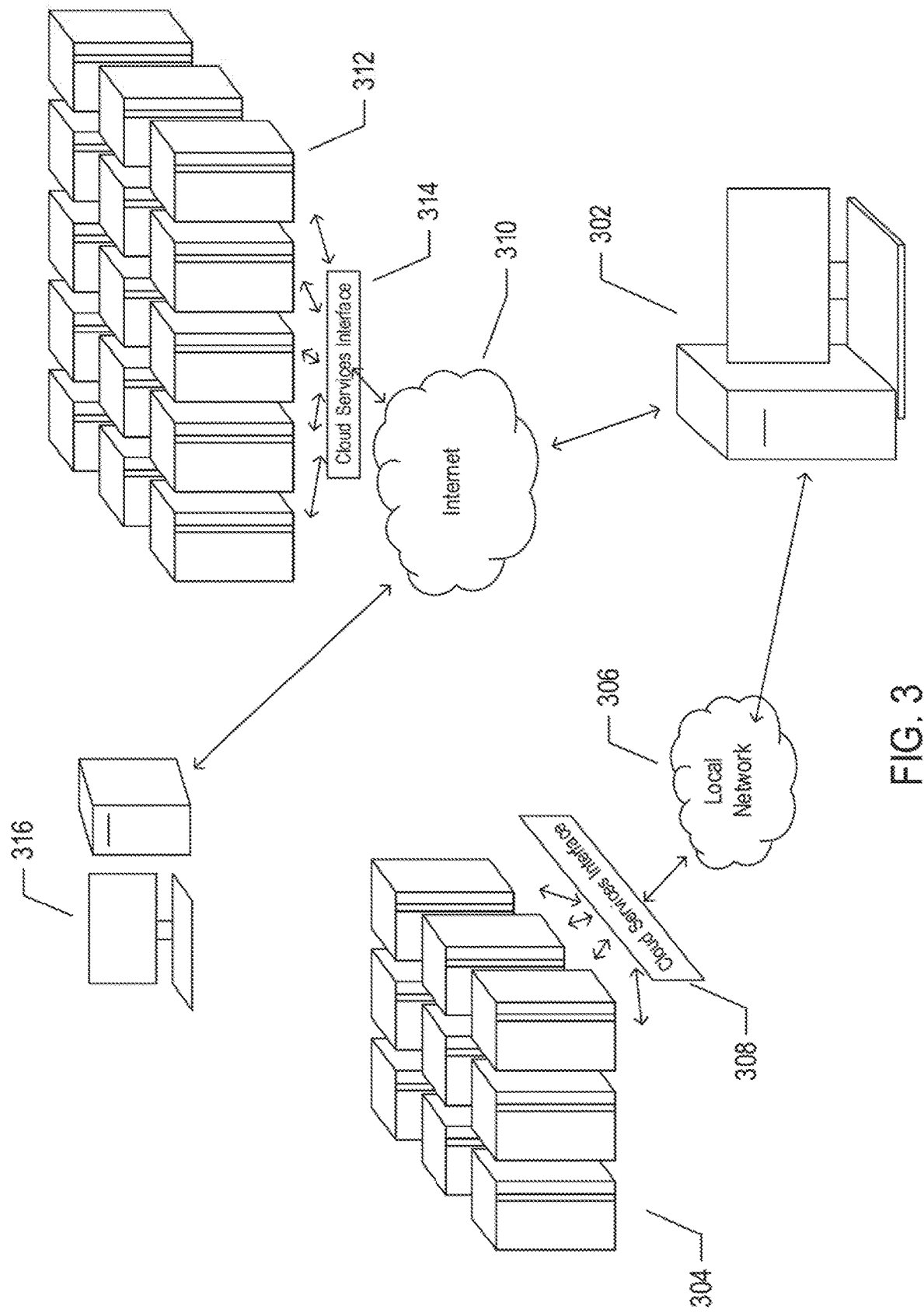
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing, service providers. In FIG. 3, a system administrator for an organization, using a PC 302, accesses the organization's private cloud 304 through a local network 306 and private-cloud interface 308 and accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
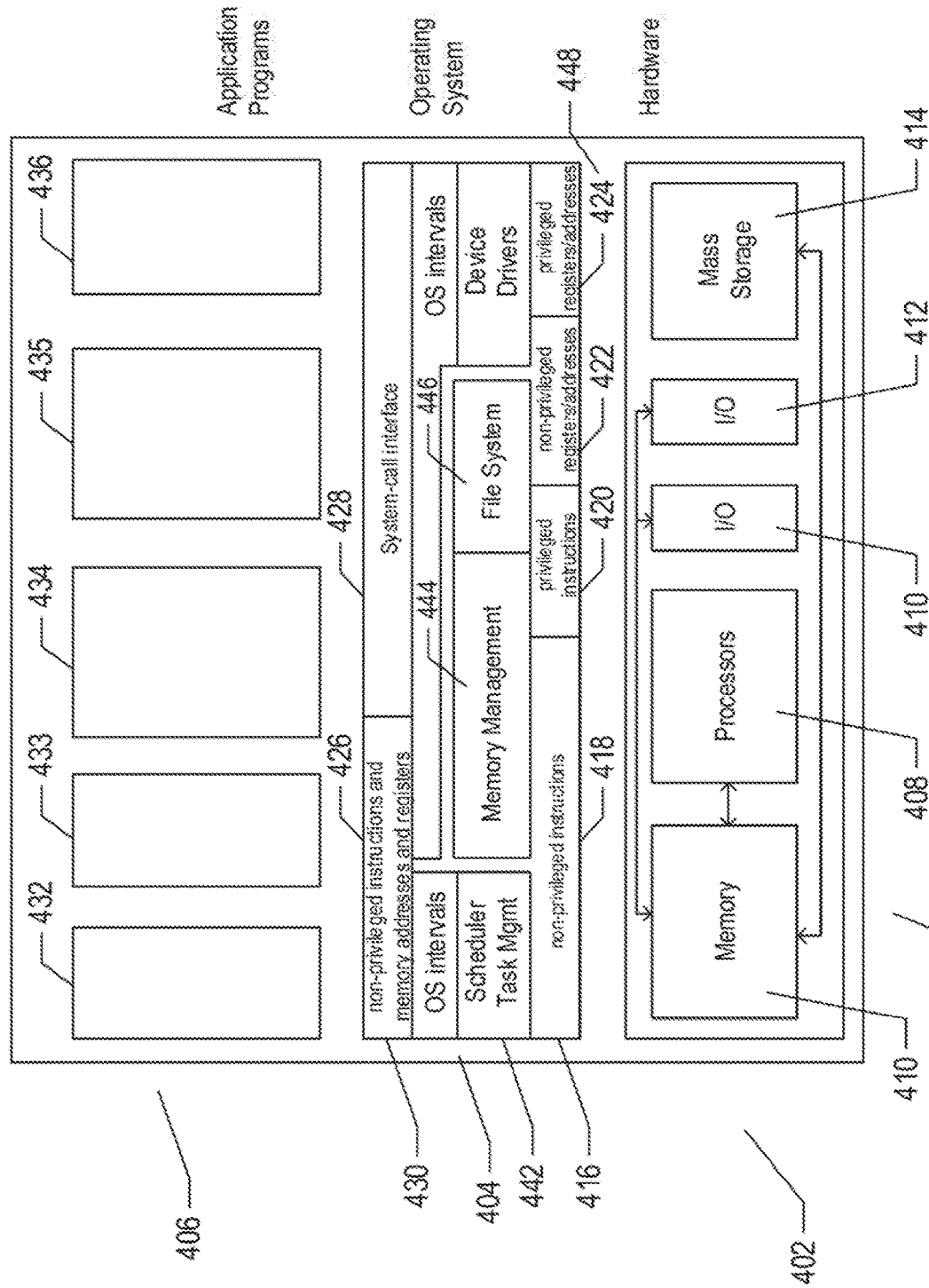
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In (lateral, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
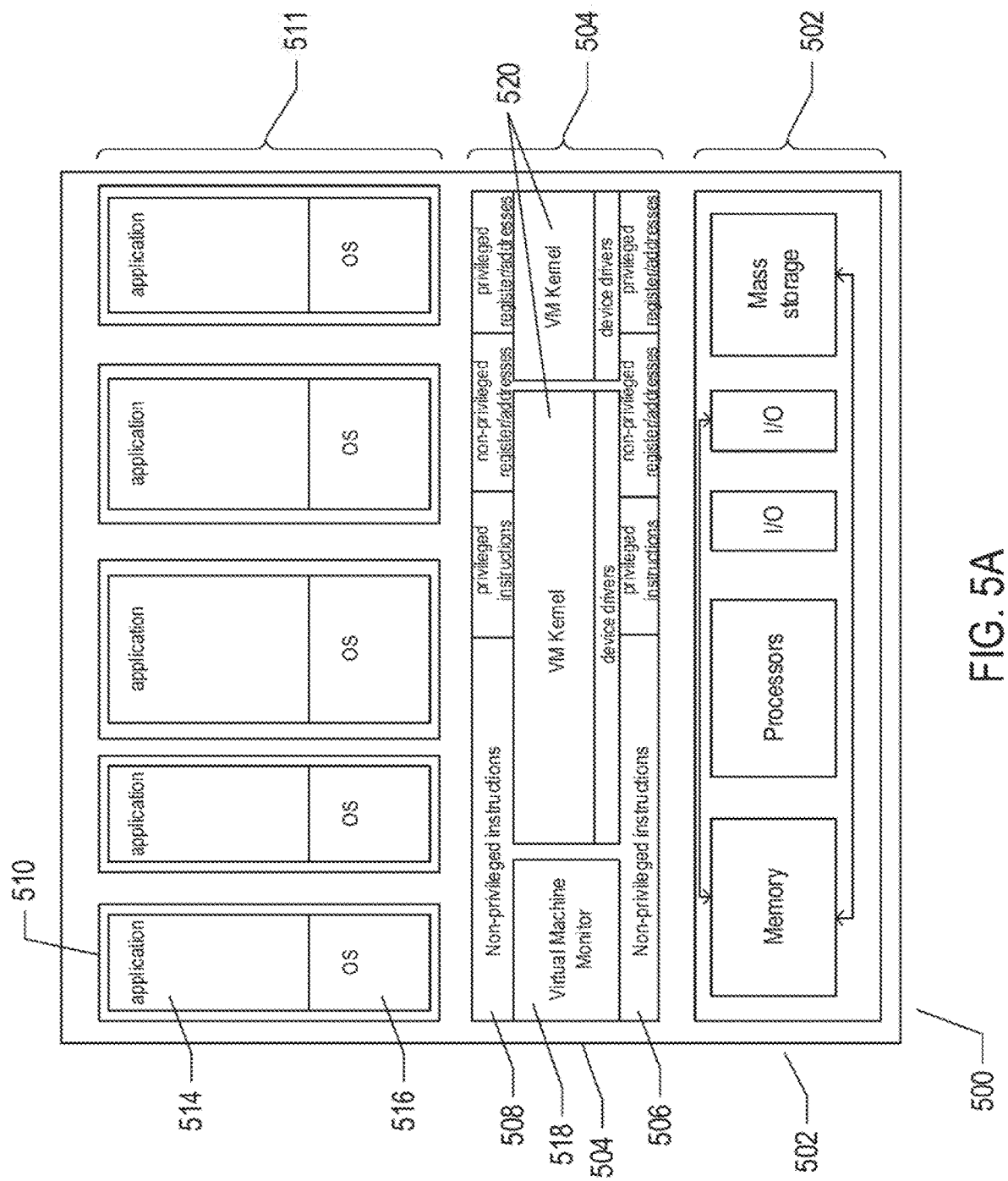
FIGS. 5A-5B show two types of virtual machine, and virtual-machine execution environments.
Figure 5B:
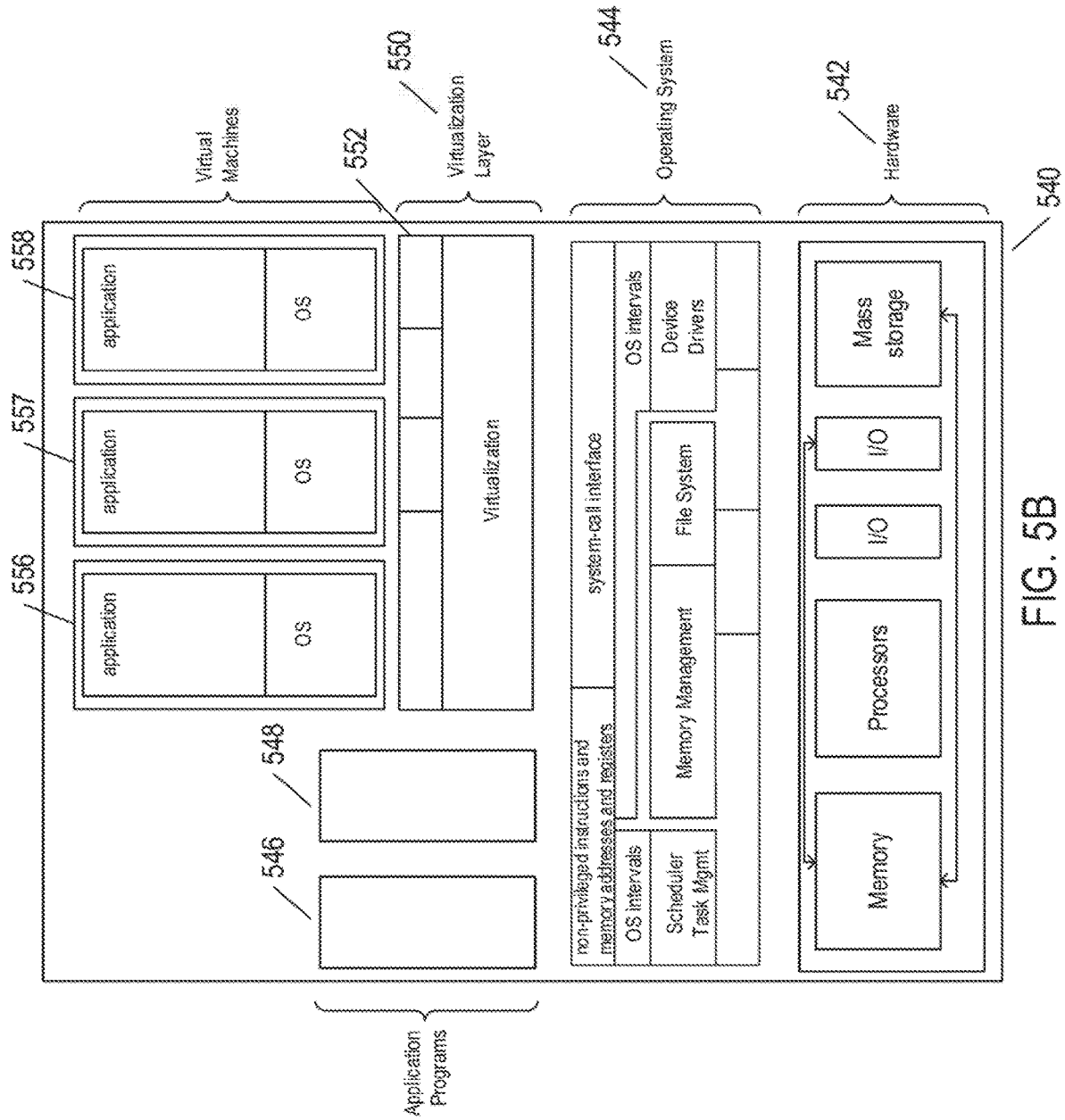

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface 508 to a number of VMs, such as VM 510, in a virtual-machine layer 511 executing above the virtualization layer 504. Each VM includes one or more application programs or other higher-level computational entities packaged together with an operating system, referred to as a "guest operating system," or a "guest OS," such as application 514 and guest OS 516 packaged together within VM 510. Each VM is thus equivalent to the operating-system layer 404 and application-program layer 406 in the general-purpose computer system shown in FIG. 4. Each guest OS within a VM interfaces to the virtualization-layer interface 508 rather than to the actual hardware interface 506. The virtualization layer 504 partitions hardware devices into abstract virtual-hardware layers to which each guest OS within a VM interfaces. The guest OSs within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization-layer interface 508 may differ for different guest OSs. For example, the virtualization layer is generally able to provide virtual hardware interfaces for a variety of different types of computer hardware. This allows, as one example, a VM that includes a guest OS designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest OS within a VM accesses virtual privileged instructions, virtual privileged registers, and virtual privileged memory through the virtualization-layer interface 508, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of VMs 556-558, each including one or more application programs or other higher-level computational entities packaged together with a guest OS.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest OSs are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest OSs are abstract or intangible. Virtual hardware layers, virtualization layers, and guest OSs execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
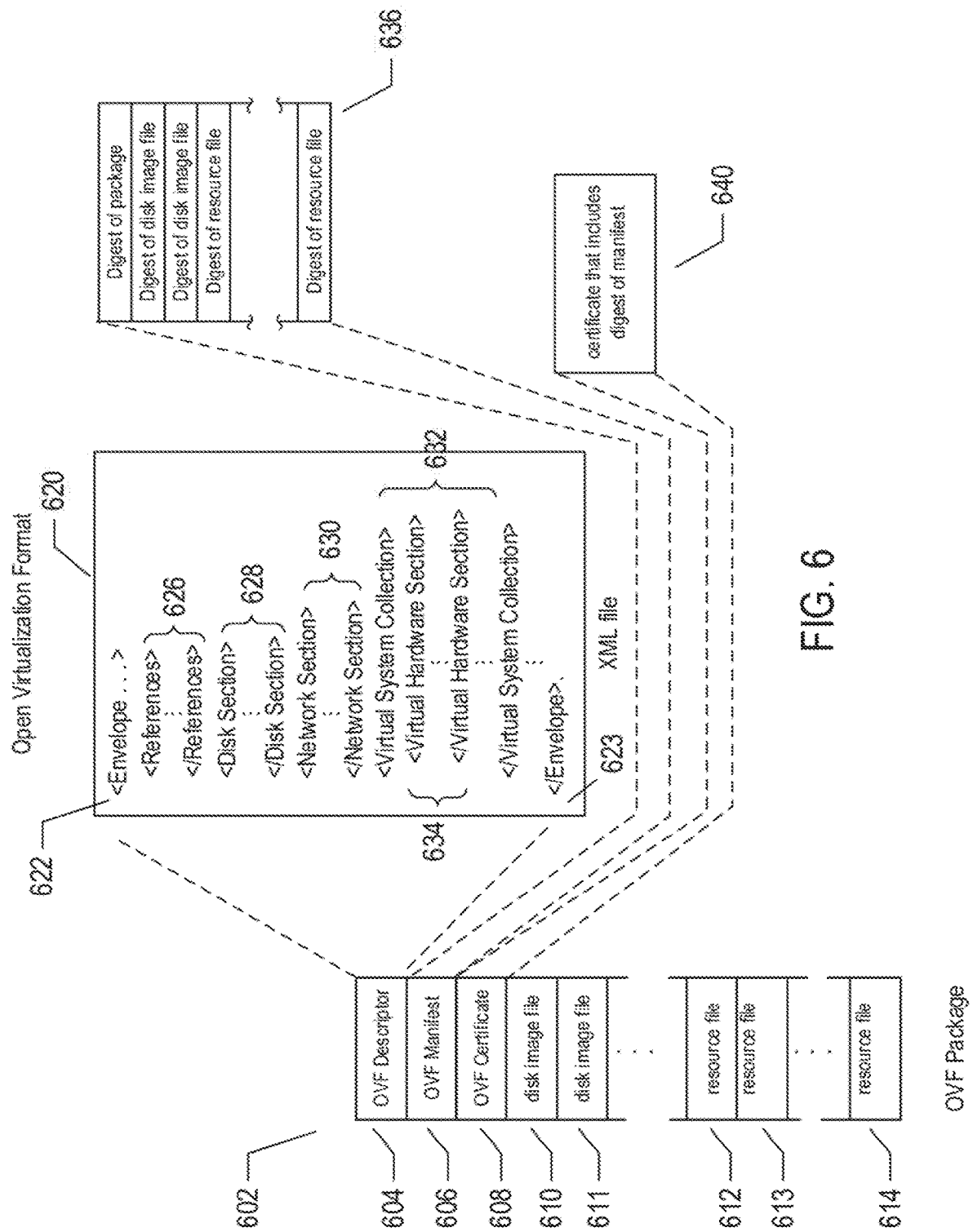
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
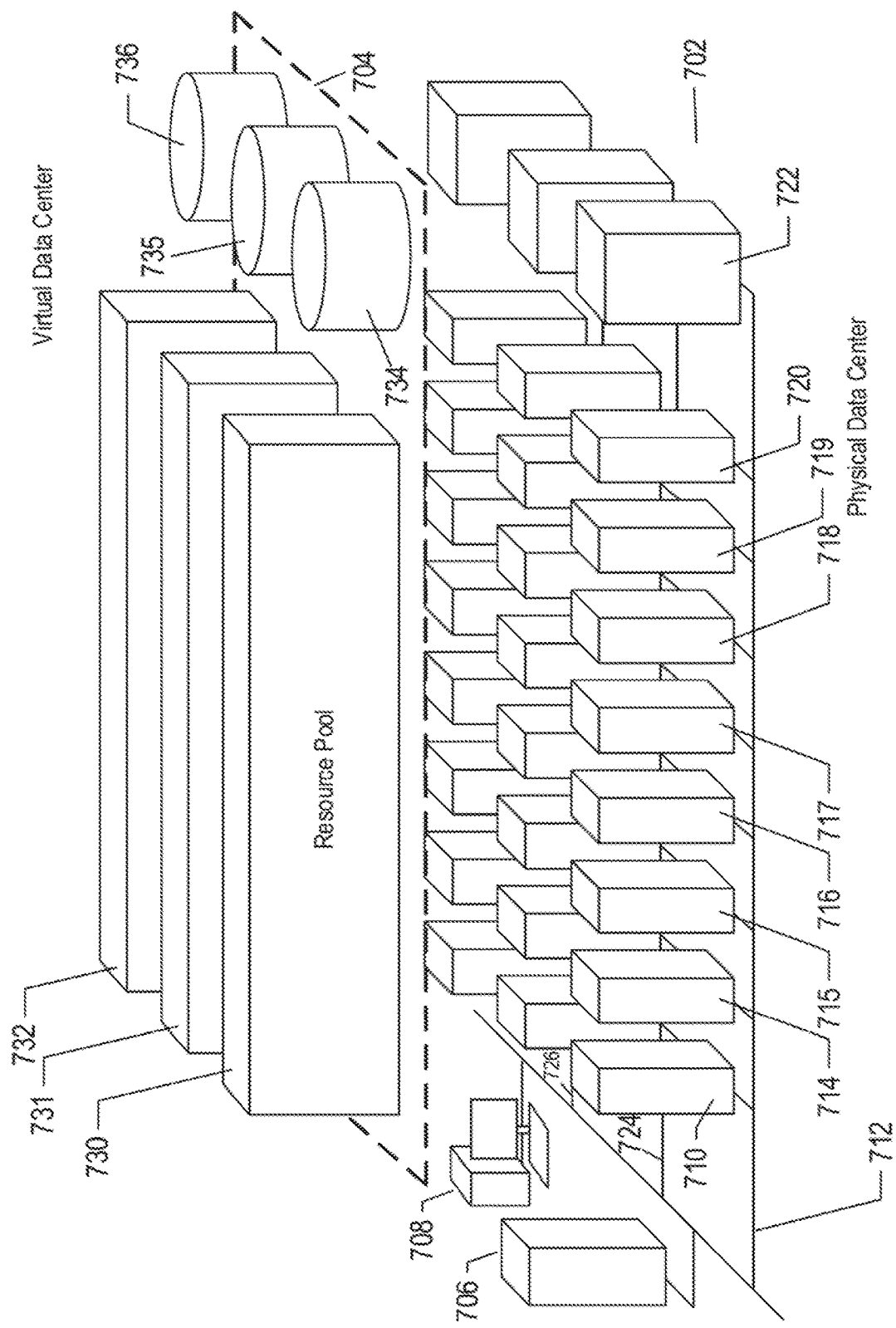
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of physical servers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server 706 includes functionality to migrate running VMs from one physical server to another in order to optimally or near optimally manage device allocation, provide fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual physical servers and migrating VMs among physical servers to achieve load balancing, fault tolerance, and high availability.

Figure 8:
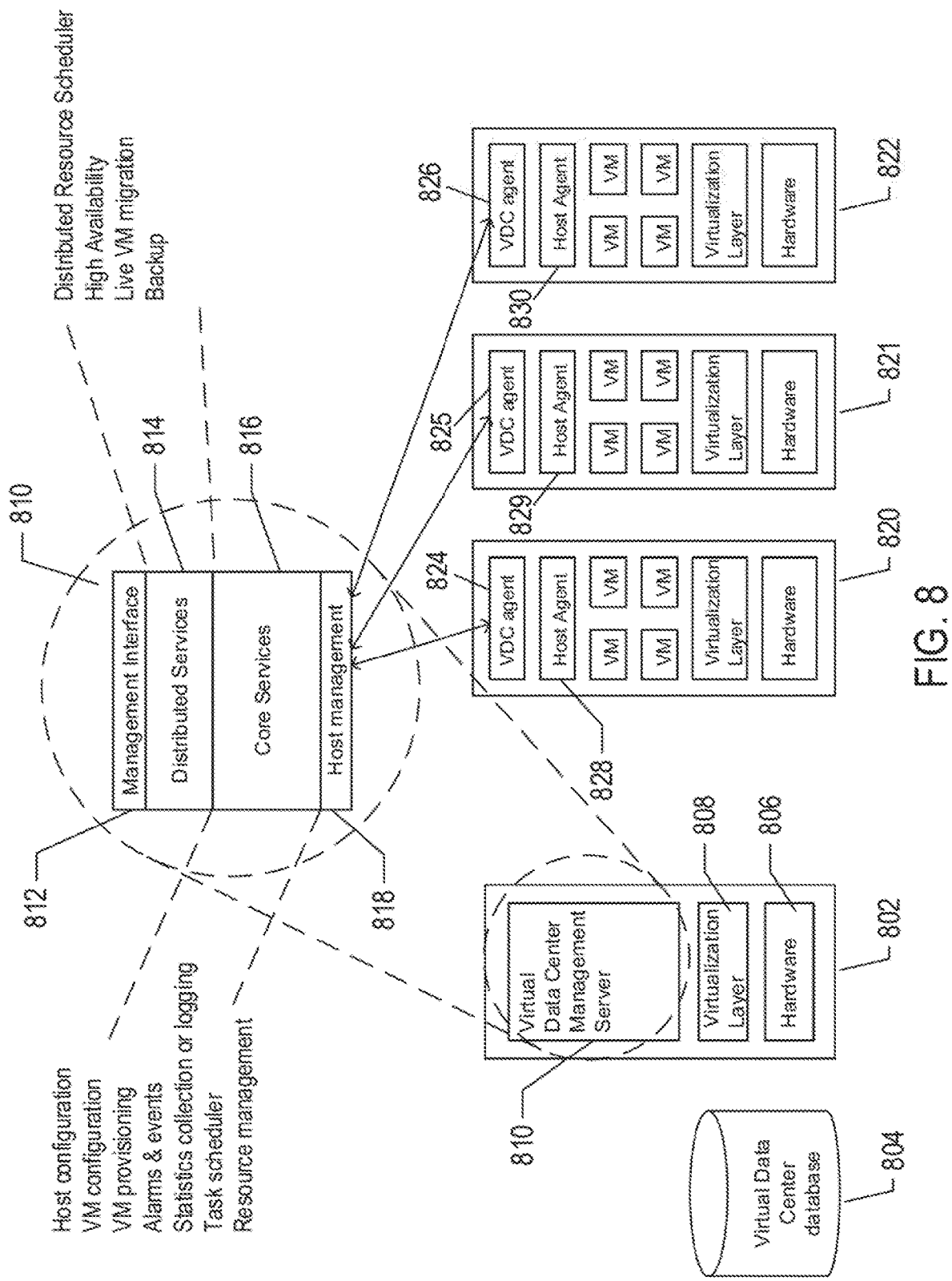
FIG. 8 shows virtual-machine components of a virtual-data-center management server and physical servers of a physical data center.

FIG. 8 shows virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server VM 810 above the virtualization layer. Although shown as a single server in FIG. 8, the virtual-data-enter management server ("VDC management server") may include two or more physical server computers that support multiple VDC-management-server virtual appliances. The VM 810 includes a management-interface component 812, distributed services 814, core services 816, and a host-management interface 818. The management interface 818 is accessed from any of various computers, such as the PC 708 shown in FIG. 7. The management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the physical servers of the physical data center that is abstracted to a virtual data center by the VDC management server.

The distributed services 814 include a distributed-device scheduler that assigns VMs to execute within particular physical servers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM an OVF package, transmits the OVF package to a different physical server, and restarts the VM on the different physical server from a virtual-machine state recorded when execution of the VM was halted. The distributed services 814 also include a distributed backup service that provides centralized virtual-machine backup and restore.

The core services 816 provided by the VDC management server 810 include host configuration, virtual-machine configuration, virtual-machine provisioning, generation of virtual-data-center alarms and events, ongoing event logging and statistics collection, a task scheduler, and a device-management module. Each physical server 820-822 also includes a host-agent VM 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce device allocations made by the VDC management server 810, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
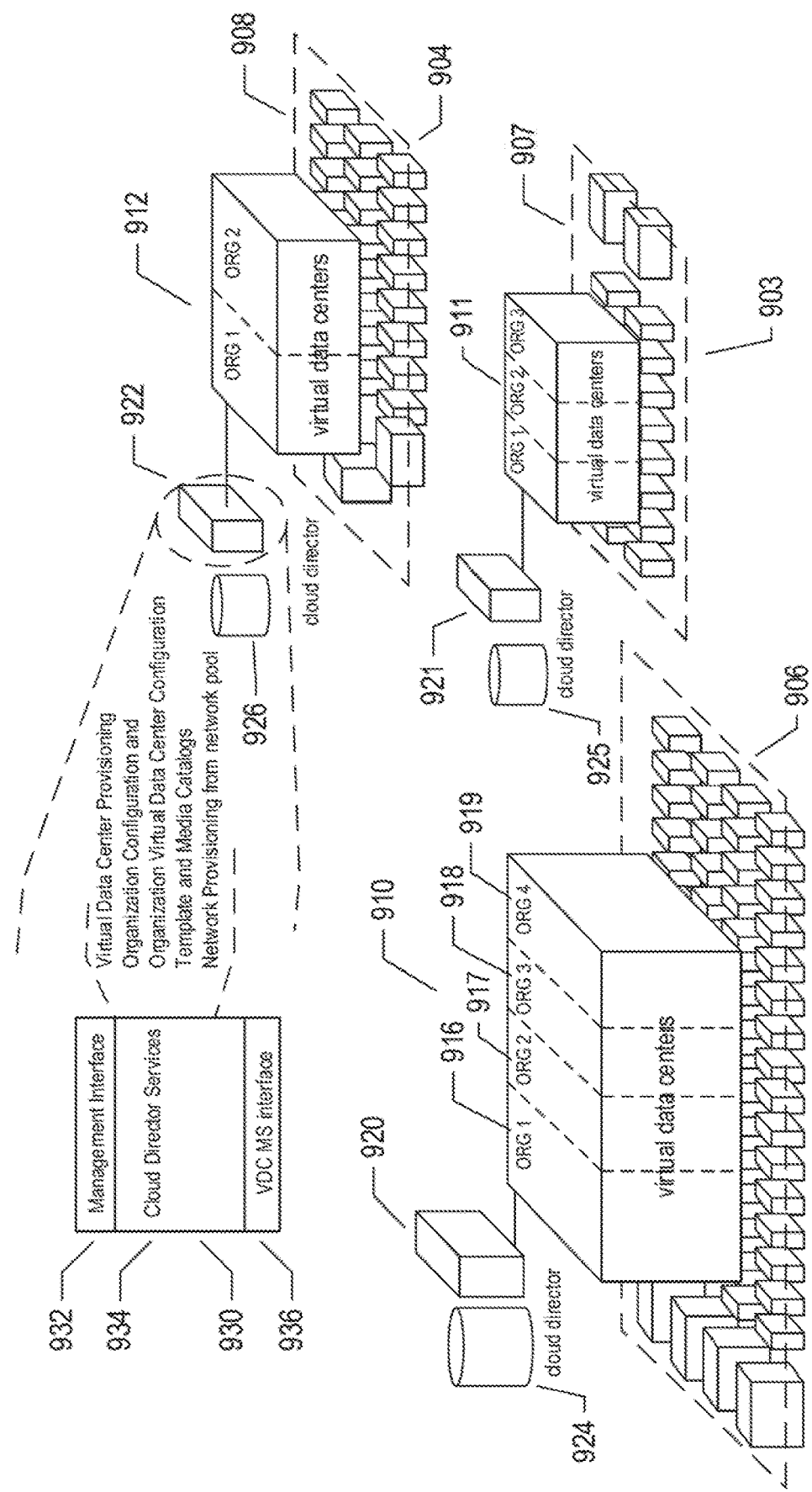
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
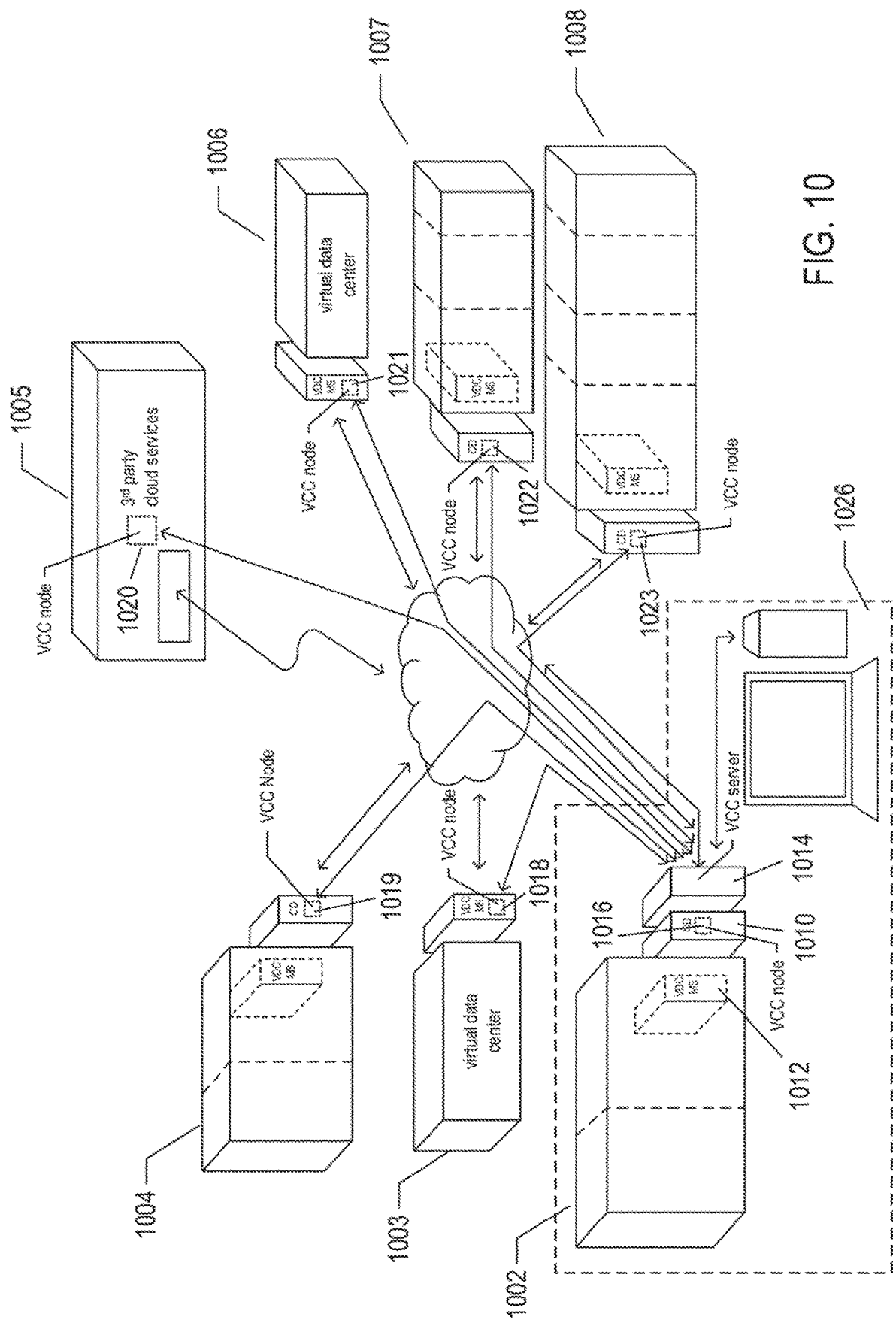
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Methods to Generate Recommendations to
Optimize OS License Cost in a Virtual Data Center Operating system vendors sell a variety of different types of guest OS licenses:

1. Instance based license. A data center customer pays a vendor for each new instance of an OS. For example, Microsoft® Windows® desktop OS license is tied to the device on which the OS is installed. As a result, the OS license cannot be reassigned to a different physical or virtual system. Red Hat® Enterprise Linux® Virtual Guest pricing requires a subscription for each VM, but there is no restriction on migration of the OS to another server computer. This is the same OS license that is purchased for a bare metal server and can be used for bare metal installs as well. Instance based OS license may be cost elective for a small number of guest OSs.

2. Volume based license. A data center customer purchases an OS license for N instances. No more than N VMs can run the guest OS.

3. Processor or socket license. An OS license is purchased for a cluster of server computers or an entire data center based on the total number of physical processor cores in the cluster or data center. In this case, a data center customer may run up to a threshold (or even infinite) number of VMs on the cluster or the data center. Core-based licensing provides a precise measure of computing power and a consistent licensing metric, regardless of whether solutions are deployed on physical server computers or in a virtual or a cloud computing environment. The number of core licenses depends on whether licenses are applied to a physical server computer or individual virtual OS environments ("OSEs") described above with reference to FIG. 5A-5B. The per-core license model allows access to an unlimited number of devices to connect from either inside or outside an organization's firewall. The options under the per core licensing model include:

Individual Virtual OSE—For each virtual OSE, the number of licenses equals the number of virtual cores in the virtual OSE, subject to a minimum requirement of four licenses per virtual OSE. In addition, if any of the virtual cores is at any time mapped to more than one hardware thread, a license for each additional hardware thread maps to the virtual core. The licenses count toward the minimum requirement of four licenses per virtual OSE.

Physical Cores on a Server Computer—The number of licenses equals the number of physical cores on the server computer multiplied by an applicable core factor. For example, certain processors have a core factor of 0.75.

Red Hat® Enterprise Linux® Advanced Platform—Subscription runs as a VMM for each server computer and comes with unlimited guest entitlements per server computer. Guest OSs can be migrated only to another server computer with the same license. Red Hat® Enterprise Linux® as a Virtual Guest 4 Packs per server computer—One four pack license for each server computer that can be pooled among licensed server computers.

Figure 11A:
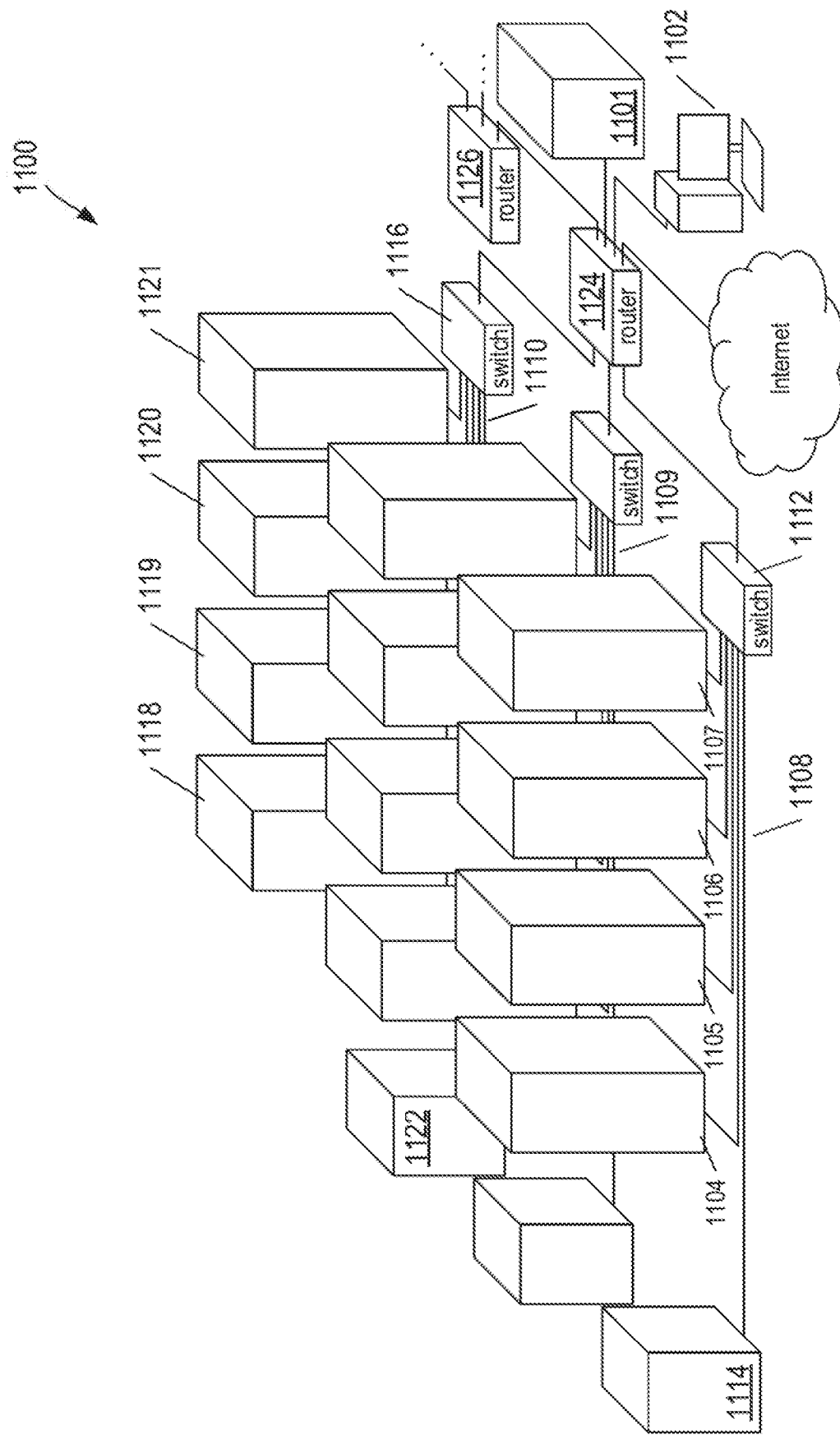
FIG. 11A shows an example of a physical data center.
Figure 11B:
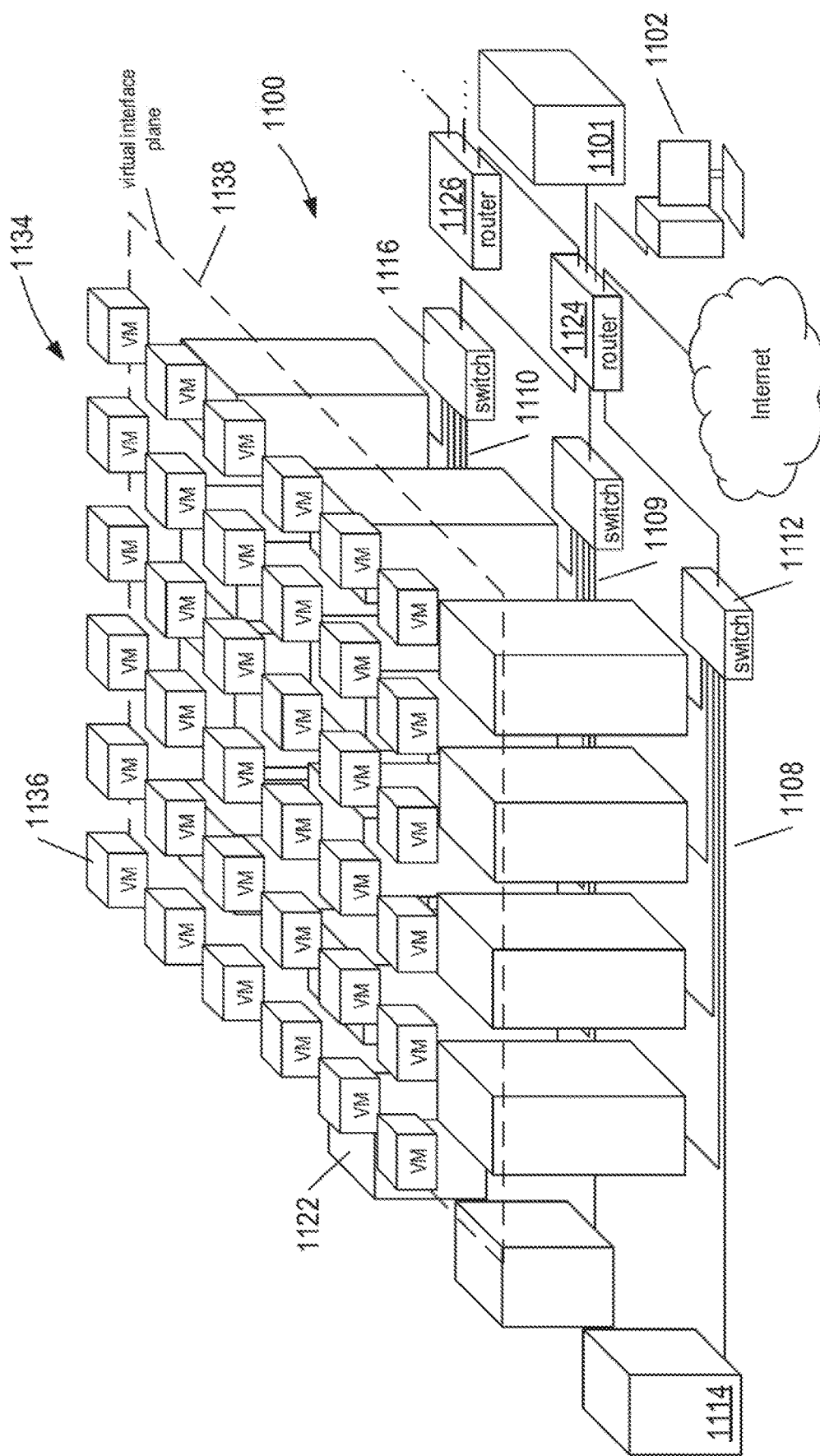
FIG. 11B shows an example set of virtual machines above a virtual interface plane.

FIG. 11A shows an example of a physical data center 1100. The physical data center 1100 consists of a VDC management server 1101 and a PC 1102 on which a virtual-data-center management interface may be displayed to system administrators and other users. The physical data center 1100 additionally includes a number of hosts or server computers, such as server computers 1104-1107, that are interconnected to form three local area networks 1108-1110. For example, local area network 1108 includes a switch 1112 that interconnects the four servers 1104-1107 and a mass-storage array 1114 via Ethernet or optical cables and local area network 1110 includes a switch 1116 that interconnects four servers 1118-1121 and a mass-storage array 1122 via Ethernet or optical cables. In this example, the physical data center 1100 also includes a router 1124 that interconnects the LANs 1108-1110 and interconnects the LANS to the Internet, the virtual-data-center management server 1101, the PC 1102 and to a router 1126 that, in turn, interconnects other LANs composed of server computers and mass-storage arrays (not shown). In other words, the routers 1124 and 1126 are interconnected to form a larger network of server computers. A resource is any physical or virtual component of the physical data center with limited availability. The server computers of the physical data center 1100 form a cluster of host computers for a VDC. FIG. 11B shows an example set of thirty-six VMs 1134, such as VM 1136, above a virtual interface plane 1138. The set of VMs 1134 may be partitioned to run on different servers and because the VMs are not bound physical devices, the VMs may be migrated to different servers in an attempt to lower cost and manage efficient use of the physical data center 1100 resources.

Figure 12:
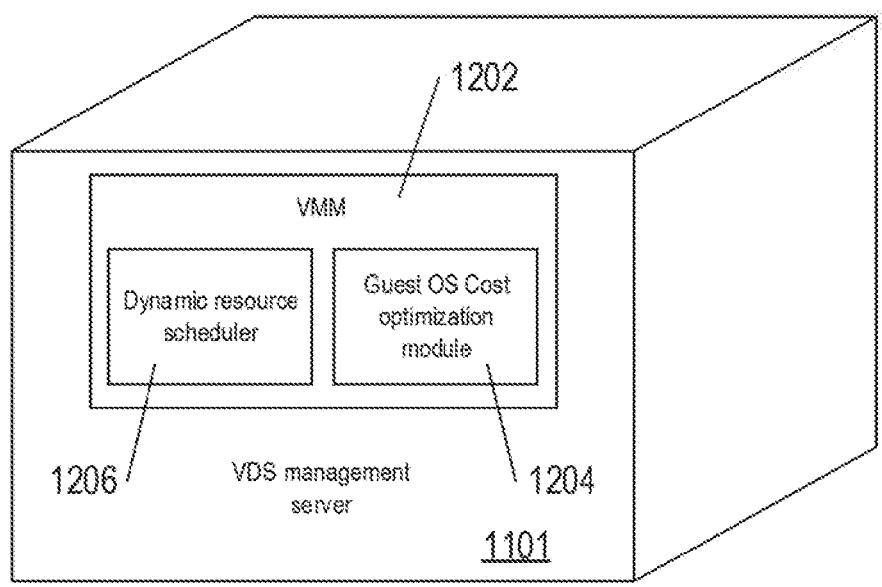
FIG. 12 shows the virtual-data-center management server.

FIG. 12 shows the VDC management server 1101. The VDC management server 1101 includes VMM 1202, which in turn includes a guest OS cost optimization module 1204 and a dynamic resource scheduler ("DRS") 1206. The VMM 1202 receives a request to create a VM from a data center tenant, customer, or from the DRS 1206. The VMM 1202 creates the VM based on computing requirements, such as processor, memory, network, storage requirements of VM. The guest OS cost optimization module 1204 identifies a VM that has or is scheduled to have an instance of an OS requiring a license. The guest OS cost optimization module 1204 may receive a request to migrate or place the VM that has or is scheduled to have the instance of the OS that requires a license in a VDC. The guest OS cost optimization module 1204 may install or build the guest OS on the VM associated with a particular server computer in the VDC. The guest OS cost optimization module keeps the VM in a powered off mode until the VM is ready to be deployed.

Figure 13:
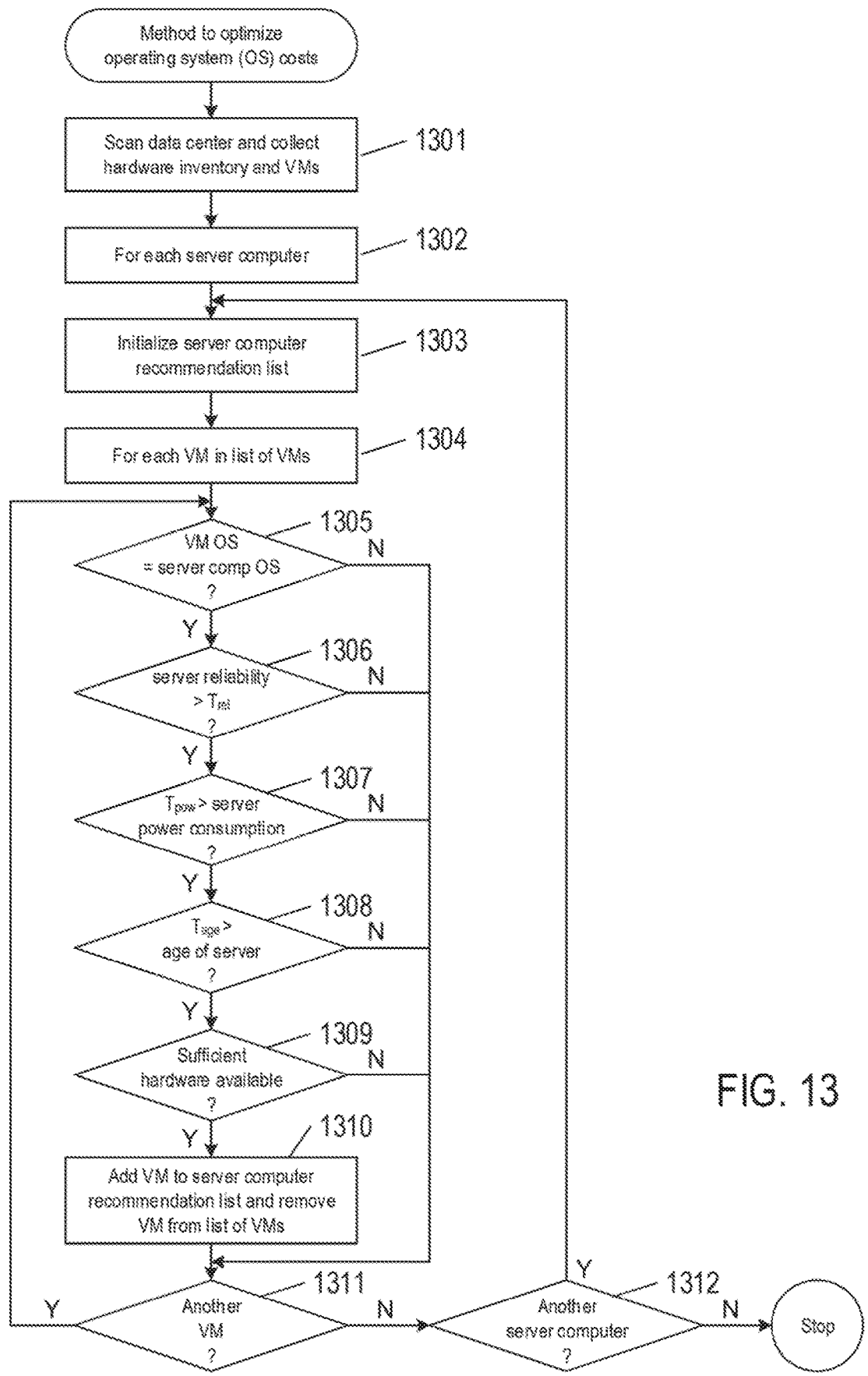
FIG. 13 shows a control-now diagram of a method to optimize virtual machine guest operating system costs in a running data center.

The guest OS cost optimization module 1204 executes methods that generate recommendations for a low-cost combination of guest OS licenses, server hardware, and VM software in order to optimize the data center costs. FIG. 13 shows a control-flow diagram of a method to optimize OS costs in a data center. In block 1301, the data center is scanned to collect an inventory of hardware and VMs and hardware and VM usage over a period of time. The server computer information collected in the scan includes the types of OSs (volume or processor based) installed on the server computers, server computer reliability, server computer power consumption, and server computer age. Server computer reliability may be a score calculated from the number and duration of outages, the number of times the server computer is not available due to maintenance and upgrades, number of application patches, how quickly server computer vendors are able to respond to security flaws. For example, the server computer reliability score may be calculated as a weighted sum of parameters, where each parameter is a numerical value that represents one of the number and duration of outages, the number of times the server computer is not available due to maintenance and upgrades, number of application patches, and a number that represents how quickly server computer vendors are able to respond to security flaws. The larger the server reliability score is for a server computer, the more reliable the server computer. Server computer reliability may be determined from surveys or from internal records and statistics maintained by the data center. Server computer power consumption may be obtained from data center records and represents the power consumption of the server computer over the period of time. The VM information collected in the scan includes VM computing requirements and type of guest OS installed on each VM. A for-loop beginning with block 1302 repeats the operations represented by blocks 1303-1310 for each server computer. In block 1303, a server computer recommendation list of compatible VMs is initialized for the server computer. A for-loop beginning with block 1304 repeats the operations represented by blocks 1305-1310 for each VM. Decision blocks 1305-1309 represent a series of criteria that may be used to add a VM to the server computer recommendation list in block 1310. In decision block 1305, when the guest OS installed on the VM matches the OS license of the server computer, control flow to decision block 1306. The guest OS installed on the VM may be an instance of a volume license, or the guest OS may be a processor or core license. In order to accommodate the VM, the OS license of the server computer matches the guest OS installed on the VM. In decision block 1306, when the server reliability score is greater than a server reliability threshold, $T_{rel}$, control flows to decision block 1307. In decision block 1307, when server power consumption is less than a power consumption threshold, control flows to decision block 1308. In decision block 1308, when the age of the server computer is less than an acceptable age threshold, $T_{age}$, control flows to decision block 1309. In decision block 1309, when the server computer hardware specifications satisfy computational specifications for the VM, control flows to block 1310, in block 1310, when the requirements represented by decision blocks 1305-1309 are satisfied, the VM is added to the server computer recommendation list. In certain implementations, when a VM has been added to the recommendation list, the VM may not be removed from a list of available VMs. In decision block 1311, the operations represented by blocks 1305-1310 are repeated for another VM, in decision block 1312, the operations represented by blocks 1303-1311 are repeated for another server computer.

The server computer recommendation lists can be used to consolidate VMs with guest OSs that can be placed on server computers that have compatible OSs and are of lower cost to operate. In particular, VMs of a particular type of processor based guest OS may be consolidated on one lower cost, processor-based license server computers, which reduces the number of licensed server computers for guest OS licenses. The guest OS cost optimization module 1204 may use the server computer recommendation lists to migrate VMs to the lower cost server computers.

The guest OS cost optimization module 1204 executes methods that may be used to aid data center customers and data center administrators to plan for additional guest OS VMs over a projected period of time (e.g., next six months or next financial year), provide recommendations on low cost combinations of VM guest OS licenses, server computer hardware and VM software to optimize the cost.

Figure 14:
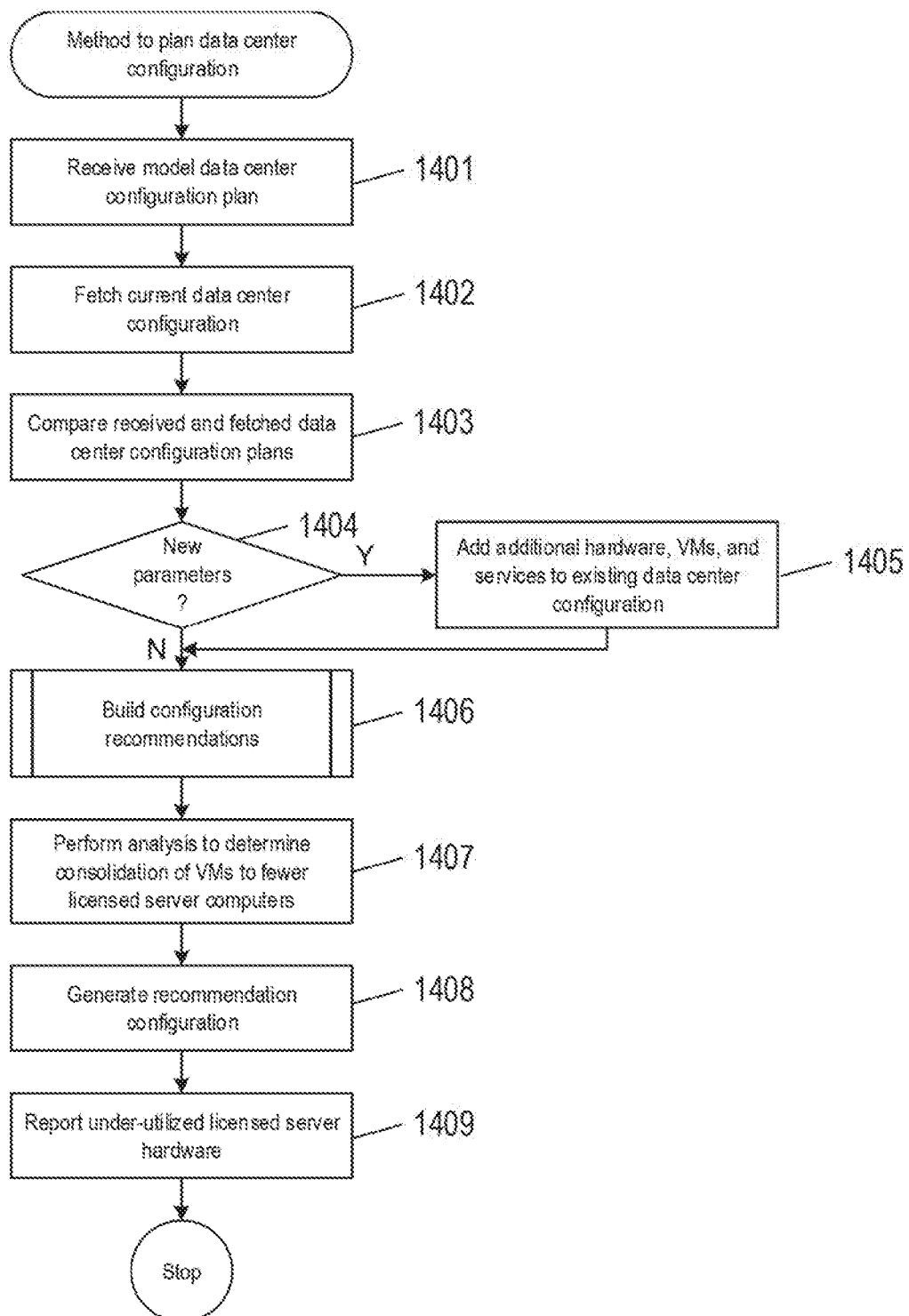
FIG. 14 shows a method to plan a data center configuration of virtual machines and data center resources.

FIG. 14 shows a method to plan a data center configuration of the VMs and data center resources. In block 1401, a model data center configuration is received. The model data center configuration may be generated by a data center administrator that identified configuration parameters, such a specified number of VMs with particular guest OSs and additional hardware. In block 1402, the current data center configuration of VMs and resources are fetched. In block 1403, the current data center configuration is compared with the model data center configuration to identify differences. In decision block 1404, if new VMs, server computers, or hardware are identified, control flows to block 1405. In block 1405, new hardware, VMs, and servers are added to the current data center configuration in order to generate a new data center configuration. In block 1406, a routine "build configuration recommendations" is called to a build data center configuration recommendation that optimizes licensing cost of the VDC. In block 1407, an analysis is performed to determine whether consolidation of VMs to fewer licensed server computers maintains utilization under expected levels. When new VMs, hardware, and services are being deployed, a number of the new VMs or services may have to run on a server licensed for the guest OS of the new VMs, such as Windows Server® or RedHat Ent Linux® based guest OS. Consider, for example, an existing licensed server cluster. It may be the case that VMs running on the server cluster are not required to have guest OS licenses, such as free Linux® distribution, but may be run on the server cluster due to availability of capacity that would otherwise go unused. This situation changes when deploying new VMs that because of their guest OSs have to be run on a licensed server. If the new workload has VMs that require guest OS licenses on the server computer, then VMs that do not require guest OS licenses are migrated to unlicensed or new server computers in order to allow the new VMs to run on the server computers that require the guest OS licenses. As a result, there is no violation of licensing terms and no need to license new server computers. In block 1408, the recommended configurations are generated. In block 1409, any under-used licensed server hardware is reported.

Figure 15:
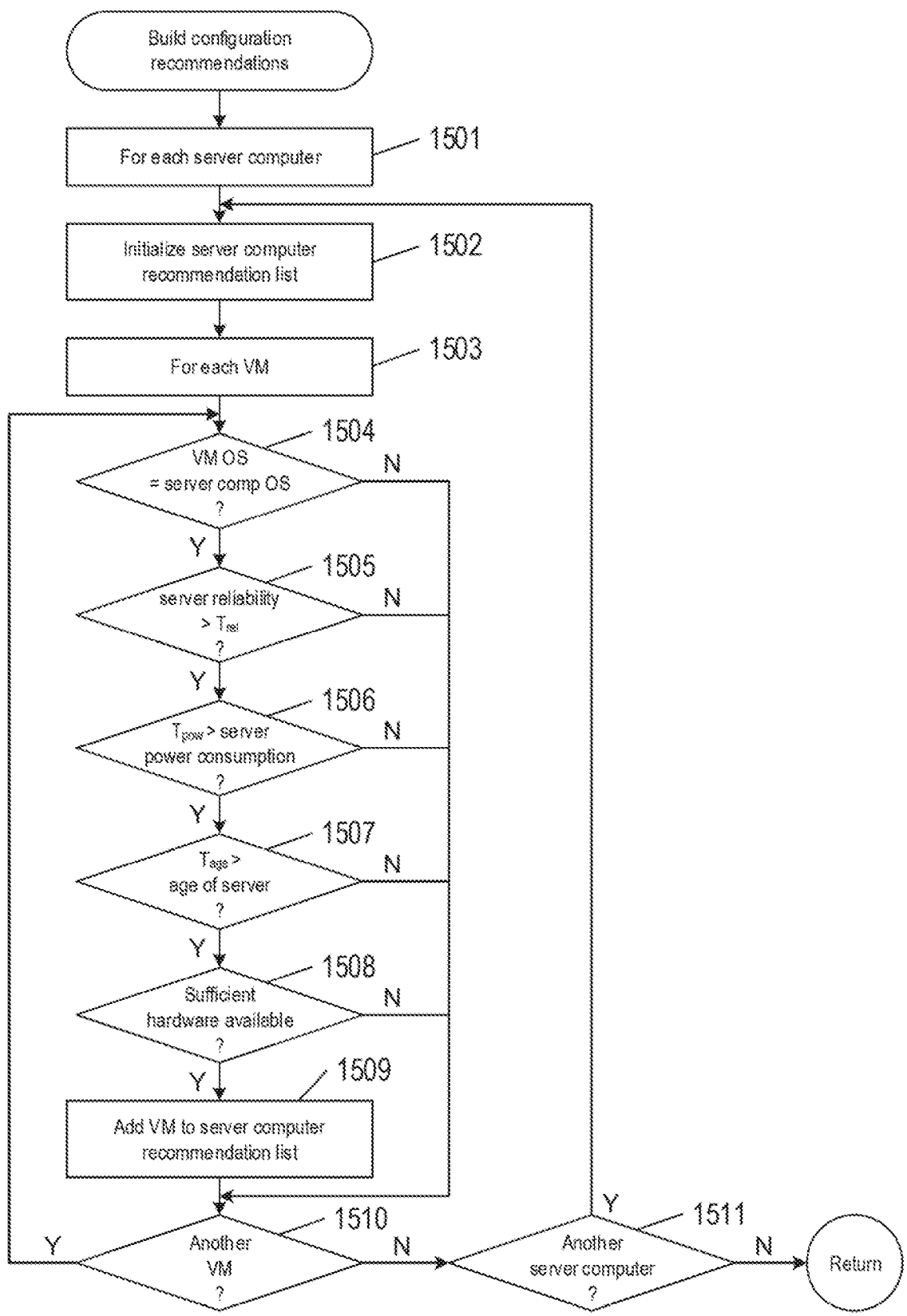
FIG. 15 shows a control-flow diagram of a routine "build configuration recommendations" called in FIG. 14.

FIG. 15 shows a control-flow diagram of the routine "build configuration recommendations" called in block 1406 of FIG. 14. A for-loop beginning with block 1501 repeats the operations represented by blocks 1502-1509 for each server computer. In block 1502, a server computer recommendation list of compatible VMs is initialized, for the server computer. A for-loop beginning with block 1503 repeats the operations represented by blocks 1504-1509 for each VM. Decision blocks 1504-1508 represent a series of criteria that may be used to add a VM to the server computer recommendation list in block 1509. In decision block 1504, when the guest OS installed on the VM matches the OS license of the server computer, control flows to decision block 1505. The guest OS installed on the VM may be an instance of a volume license, or the guest OS may be a processor or core license. In order to accommodate the VM, the OS license of the server computer should match the guest OS installed on the VM. In decision block 1505, when the server reliability score is greater than a server reliability threshold, $T_{rel}$, control flows to decision block 1506. In decision block 1506, when server power consumption is less than server power consumption threshold, $T_{pow}$, control flows to decision block 1507. In decision block 1507, when the age of the server computer is less than an acceptable age threshold, $T_{age}$, control flows to decision block 1508. In decision block 1508, when the server computer hardware specifications corresponds to the computational specifications for the VM, control flows to block 1509. In block 1509, when the requirements represented by decision blocks 1504-1508 as satisfied, the VM is added to the server computer recommendation list for the server computer. In decision block 1510, the operations represented by blocks 1504-1509 are repeated for another VM. In decision block 1511, the operations represented by blocks 1502-1510 are repeated for another server computer.

The method of FIG. 14 is part of data center/cloud planning. A data center administrator may want to add additional server computer hardware and other resources for expanded capacity. The administrator derives a model based on factors, such as future capacity forecast, type of load classified based on guest OS, and expected network consumption of VMs. The method receives the data center plan, combines the existing inventory and usage history and proposes a model to optimize the load on server computers considering the licensing as one of the factors. The configuration recommendations may be used by expensive server hardware with several processor cores and higher memory so that several VMs may be consolidated and only a few server computers may be licensed based on the socket based licensing model. Lower cost server computers may be purchased with lower configuration if the majority of VMs are using guest OS instance based licensing. Existing VMs with a guest OS like Linux® running on the same server as Windows® VMs using socket based licensing may be recommended for migration onto new lower cost server computers so that additional capacity may be created on existing licensed server hardware to run more windows VMs, without having to buy additional licenses.

The guest OS cost optimization module 1204 includes methods that determine when a customer is not using DRS 1206, lowers overall costs by using DRS 1206 to reduce vendor licensing cost when the customer is not using DRS 1206. The DRS licensing cost may be offset and result in a cost savings by using DRS 1206 to optimize the overall data center software licensing cost. When DRS 1206 is activated, DRS 1206 reorganizes the distributed computing load. If there are a number of VMs with guest OS requiring socket based license are running, considering the guest OS licensing cost may be important to avoid licensing a large number of server computers and keep optimal hardware redundancy and load. By extending the DRS 1206 to consider guest OS licensing cost, and present a trial duration to customers that demonstrates DRS 1206 can lower cost to data center customers, even when the load on the data center is optimally deployed. Occasionally, a less optimal load may lead to significant savings, therefore this feature can dynamically show models opportunity to balance optimal usage along with cost savings.

The guest OS cost optimization module 1204 includes methods to report underutilized licensed server computers and provide recommendations of cost savings if the volume licenses can be replaced by instance based software licenses. Methods periodically scan a data center and collect the inventory, usage history, and expenses, which includes hardware costs, licensing costs, and labor. Methods then perform an analysis to show that a customer who bought guest OS licenses is not utilizing them effectively. For example, suppose a data center customer purchased unlimited instance licenses for an enterprise. However, based on the historic usage, there is an opportunity to save cost by moving away from unlimited licensing to limited instances licensing. As another example, consider a number of servers that have been licensed to run a particular guest OS based on socket based licensing. However, over a period of time those services are no longer available and these server computers need not be licensed for the guest OS. As a result, a recommendation may be generated to avoid renewing licenses for such servers.

The guest OS cost optimization module 1204 includes methods to calculate configuration recommendations that optimize the cost to data center customers while deploying new services. The input is a plan for new application services, which includes types of VMs, the type of licensed software, the types of guest OSs. Method generate a plan to optimize server computer utilization based on licensing, including recommendations to buy new computer hardware.

Figure 16:
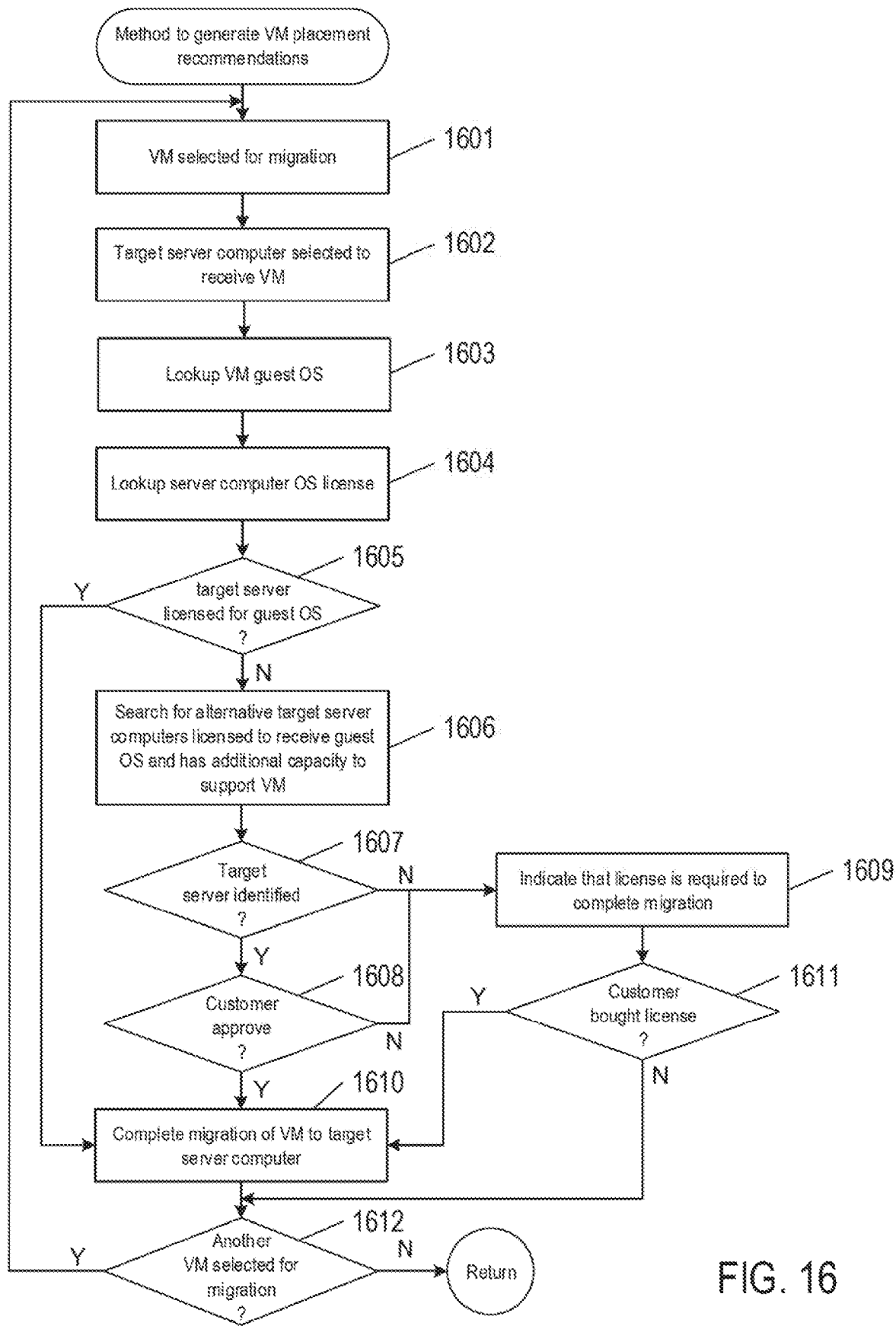
FIG. 16 shows a control-flow diagram of a method to generate virtual machine placement recommendations.

The guest OS cost optimization module 1204 provides VM placement recommendations to data center customers while a customer attempts to manually performing VM migration. FIG. 16 shows a control-flow diagram of a method to generate VM placement recommendations. In block 1601, a VM is selected by a data center customer for migration to a target server computer. In block 1602, the target server computer is identified. In block 1603, the guest OS of the VM is identified. In block 1604, the target server computer OS license is identified. In decision block 1605, if the target server computer is licensed for the guest OS of the VM, control flows to block 1610. Otherwise, control flows to block 1606. In block 1606, a search is conducted to identify a server computer with an OS that is licensed for the guest OS of the VM selected for migration and has additional computational and storage capacity to support the VM. In decision block 1607, if a target server computer has been identified, control flows to decision block 1608. Otherwise, control flows to block 1609. In decision block 1608, the customer is asked if the customer approves of an alternative target server computer. If the customer approves, control flows to block 1610. If the customer does not approve, control flows to block 1609. In block 1609, an alert is generated indicating that the migration cannot be completed because the target server computer does not have a license that is compatible with the guest OS of the VM. In block 1610, migration of the VM to the target server computer is completed. In decision block 1611, if the customer decides to purchase a license for the target server computer, control flows to block 1610. If the customer decides not to purchase the license, control flows to decision block 1612. In decision block 1612, if the data center customer has selected another VM for migration, control returns to block 1601.

It is appreciated that the various implementations described herein are intended to enable any person skilled in the an to make or use the present disclosure. Various modifications to these implementations will be readily apparent to those skilled in the art, and the generic principles defined herein may be applied to other implementations without departing from the spirit or scope of the disclosure. For example, any of a variety of different implementations can be obtained by varying any of many different design and development parameters, including programming language, underlying operating system, modular organization, control structures, data structures, and other such design and development parameters. Thus, the present disclosure is not intended to be limited to the implementations described herein but is to be accorded the widest scope consistent with the principles and novel features disclosed herein.

What is claimed is:

1. A method to optimize a group of server computers hosting virtual machines ("VMs"), the method comprising:
    causing one or more VMs to migrate onto a first server computer based, at least in part, on a reliability of the first server computer, a power consumption of the first server, and an age of the first server computer;

determining a first utilization level of the first server computer based on a usage of VMs hosted on the first server computer ("hosted VMs") including the one or more VMs;

identifying a first license type associated with the first server computer;

forecasting a second utilization level associated with a second license type for the first server computer;

determining that the second utilization level associated with the second license type for the first server computer requires migrating at least one of the one or more VMs to a second server computer;

determining that, as a result of migrating the at least one of the one or more VMs to the second server computer, a licensing cost savings can be achieved by switching from the first license type to the second license type at the first server computer;

generating a recommendation to migrate the at least one of the one or more VMs to the second server computer to achieve the licensing cost savings based on switching from the first license type to the second license type for the first server computer; and providing the recommendation to the group of server computers to rebalance the hosted VMs, wherein the first license type and the second license type are different license types from a group including volume based, socket, limited instance based, and unlimited instance based license types.

2. The method of claim 1, wherein identifying the first license type associated with the first server computer includes identifying that the first license type is associated with at least one of the hosted VMs.

3. The method of claim 1, further comprising determining the first utilization level and the first license type by scanning each of the hosted VMs.

4. The method of claim 1, wherein the recommendation includes an instruction to rebalance the hosted VMs to use the second license type instead of the first license type.

5. The method of claim 1, wherein the first license type is a volume based license and the second license type is a limited instance based license or an unlimited instance based license.

6. The method of claim 1, wherein the first license type is a socket license.

7. The method of claim 6, wherein the recommendation includes recommending to a user that the socket license for the first server computer not be renewed and the hosted VMs be migrated to another of the group of server computers.

8. A non-transitory, computer-readable medium containing instructions executed by at least one processor to perform stages to optimize a group of server computers hosting virtual machines ("VMs"), the stages comprising:

causing one or more VMs to migrate onto a first server computer based, at least in part, on a reliability of the first server computer, a power consumption of the first server computer, and an age of the first server computer;

determining a first utilization level of the first server computer based on a usage of VMs hosted on the first server computer ("hosted VMs") including the one or more VMs;

identifying a first license type associated with the first server computer;

forecasting a second utilization level associated with a second license type for the first server computer;

determining that the second utilization level associated with the second license type for the first server computer requires migrating at least one of the one or more VMs to a second server computer;

determining that, as a result of migrating the at least one of the one or more VMs to the second server computer, a licensing cost savings can be achieved by switching from the first license type to the second license type at the first server computer;

generating a recommendation to migrate the at least one of the one or more VMs to the second server computer to achieve the licensing cost savings based on switching from the first license type to the second license type for the first server computer; and providing the recommendation to the group of server computers to rebalance the hosted VMs, wherein the first license type and the second license type are different license types from a group including volume based, socket, limited instance based, and unlimited instance based license types.

9. The non-transitory, computer-readable medium of claim 8, wherein identifying the first license type associated with the first server computer includes identifying that the first license type is associated with at least one of the hosted VMs.

10. The non-transitory, computer-readable medium of claim 8, the stages further comprising determining the first utilization level and the first license type by scanning each of the hosted VMs.

11. The non-transitory, computer-readable medium of claim 8, wherein the recommendation includes an instruction to rebalance the hosted VMs to use the second license type instead of the first license type.

12. The non-transitory, computer-readable medium of claim 8, wherein the first license type is a volume based license and the second license type is a limited instance based license or an unlimited instance based license.

13. The non-transitory, computer-readable medium of claim 8, wherein the first license type is a socket license.

14. The non-transitory, computer-readable medium of claim 13, wherein the recommendation further includes recommending to a user that the socket license for the first server computer not be renewed and the hosted VMs be migrated to another of the group of server computers.

15. A system for optimizing a group of server computers hosting virtual machines ("VMs"), comprising:

a memory storage including a non-transitory, computer-readable medium comprising instructions; and a computing device including a hardware-based processor that executes the instructions to carry out stages comprising:

causing one or more VMs to migrate onto a first server computer based, at least in part, on a reliability of the first server computer, a power consumption of the first server computer, and an age of the first server computer;

determining a first utilization level of the first server computer based on a usage of VMs hosted on the first server computer ("hosted VMs") including the one or more VMs;

identifying a first license type associated with the first server computer;

forecasting a second utilization level associated with a second license type for the first server computer;

determining that the second utilization level associated with the second license type for the first server computer requires migrating at least one of the one or more VMs to a second server computer;

determining that, as a result of migrating the at least one of the one or more VMs to the second server computer, a licensing cost savings can be achieved by switching from the first license type to the second license type at the first server computer;

generating a recommendation to migrate the at least one of the one or more VMs to the second server computer to achieve the licensing cost savings based on switching from the first license type to the second license type for the first server computer; and providing the recommendation to the group of server computers to rebalance the hosted VMs, wherein the first license type and the second license type are different licenses types from a group including volume based, socket, limited instance based, and unlimited instance based license types.

16. The system of claim 15, wherein identifying the first license type associated with the first server computer includes identifying that the first license type is associated with at least one of the hosted VMs.

17. The system of claim 15, further comprising determining the first utilization level and the first license type by scanning each of the hosted VMs.

18. The system of claim 15, wherein the recommendation includes an instruction to rebalance the hosted VMs to use the second license type instead of the first license type.

19. The system of claim 15, wherein the first license type is a volume based license and the second license type is a limited instance based license or an unlimited instance based license.

20. The system of claim 15, wherein the first license type is a socket license.

* * * * *